Aug. 13, 1929.　　　　M. JAEGER　　　　1,724,483
GLASS PRESSING AND BLOWING MACHINE
Original Filed April 17, 1922　　23 Sheets-Sheet 5
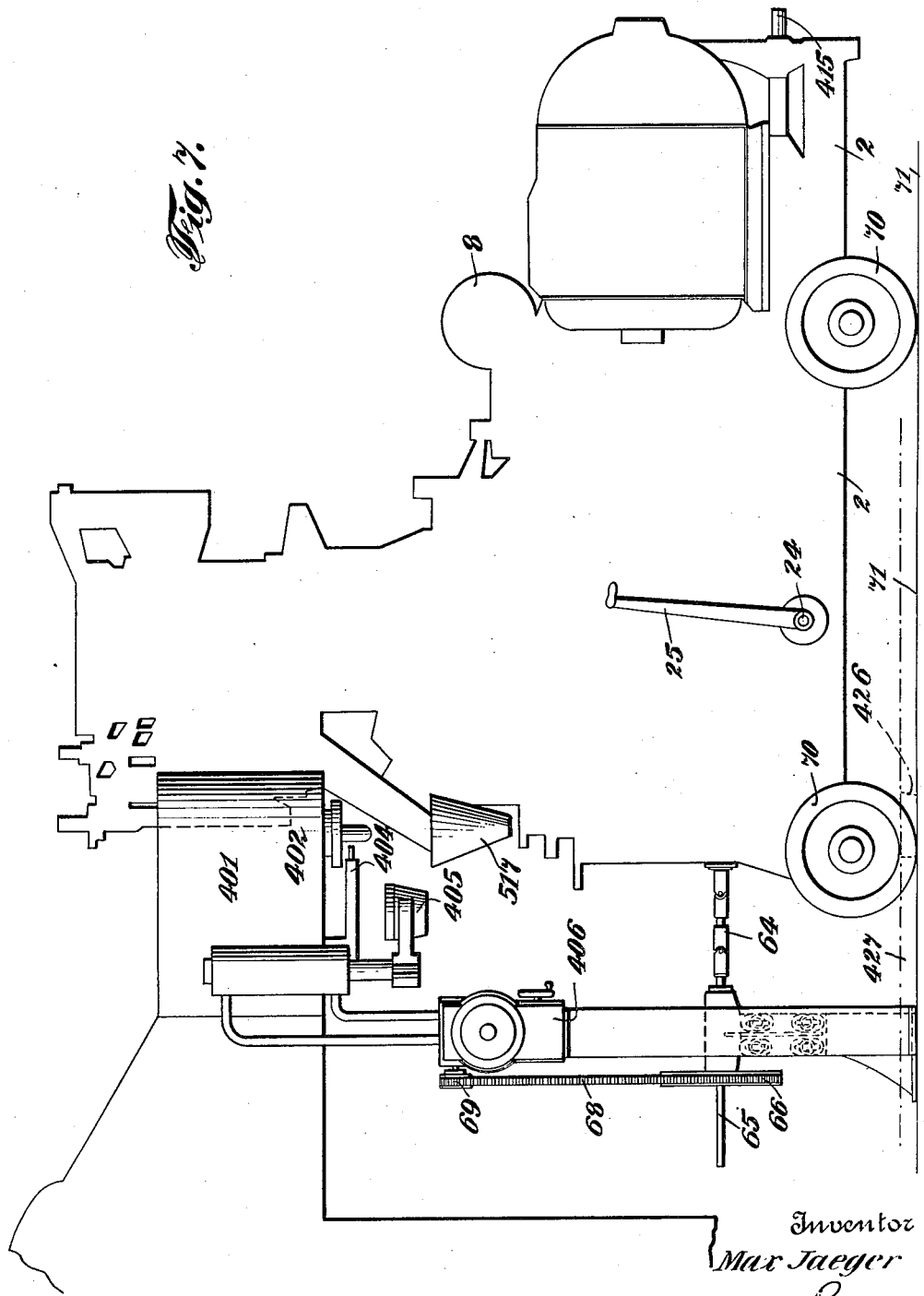

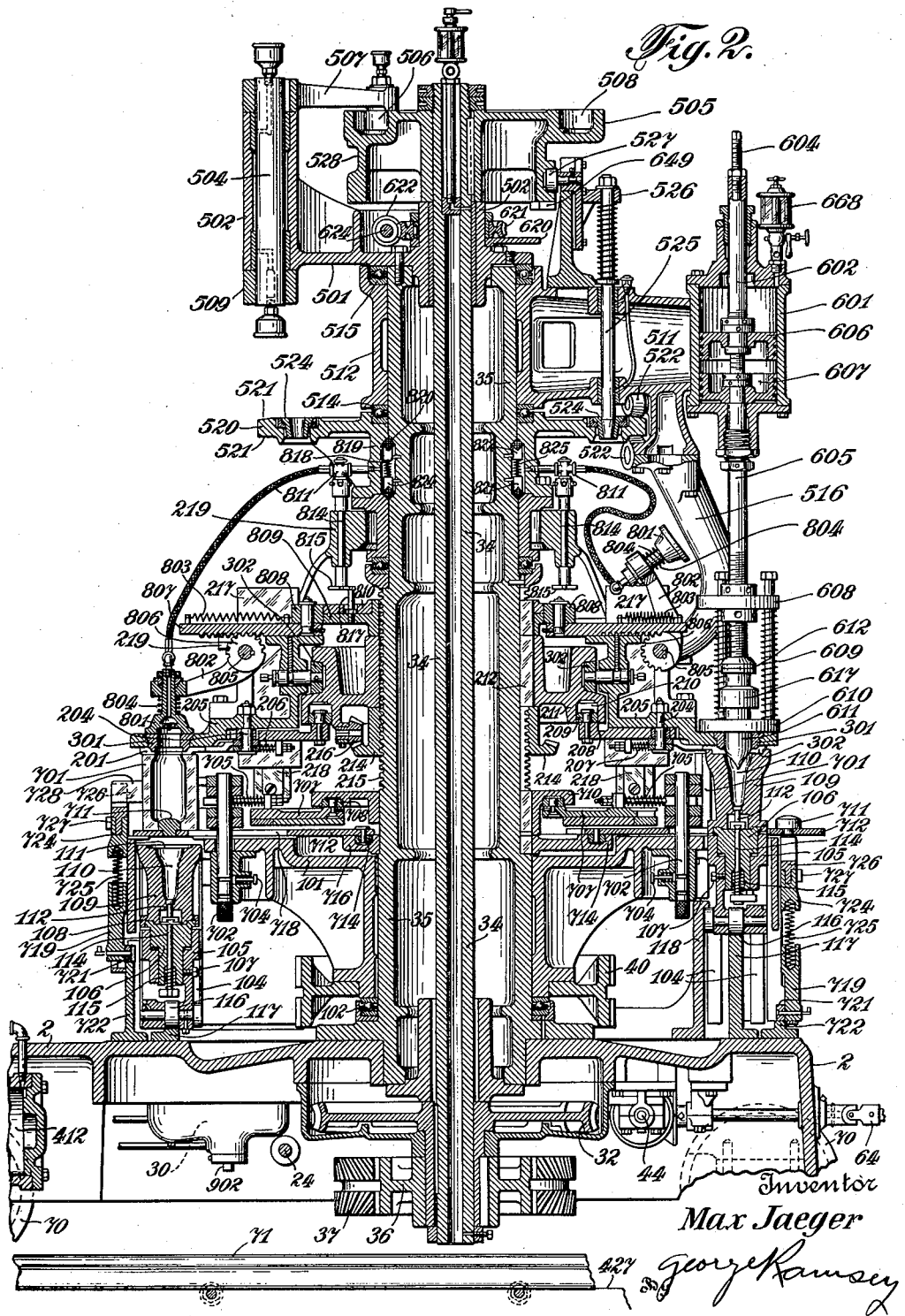

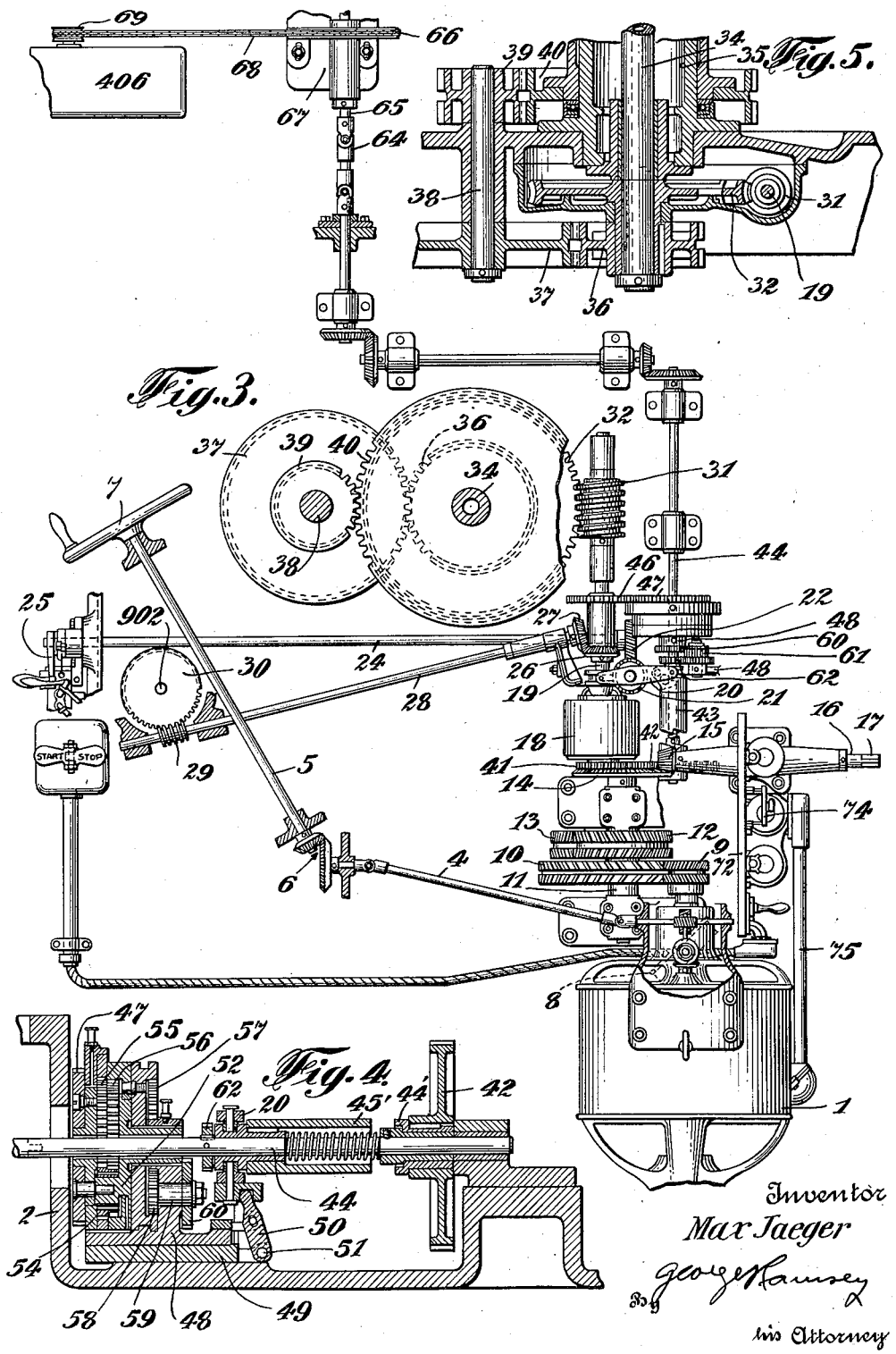

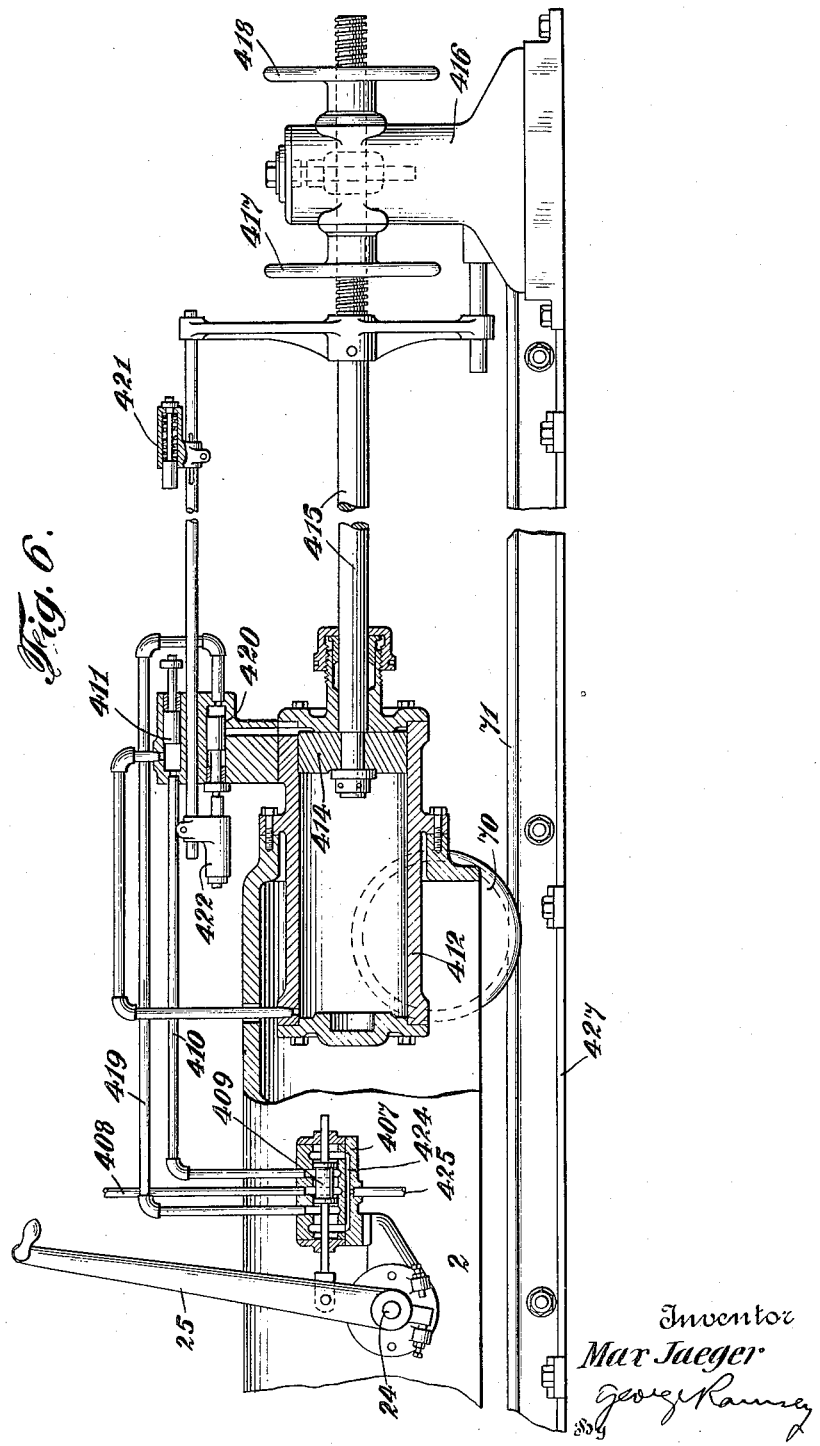

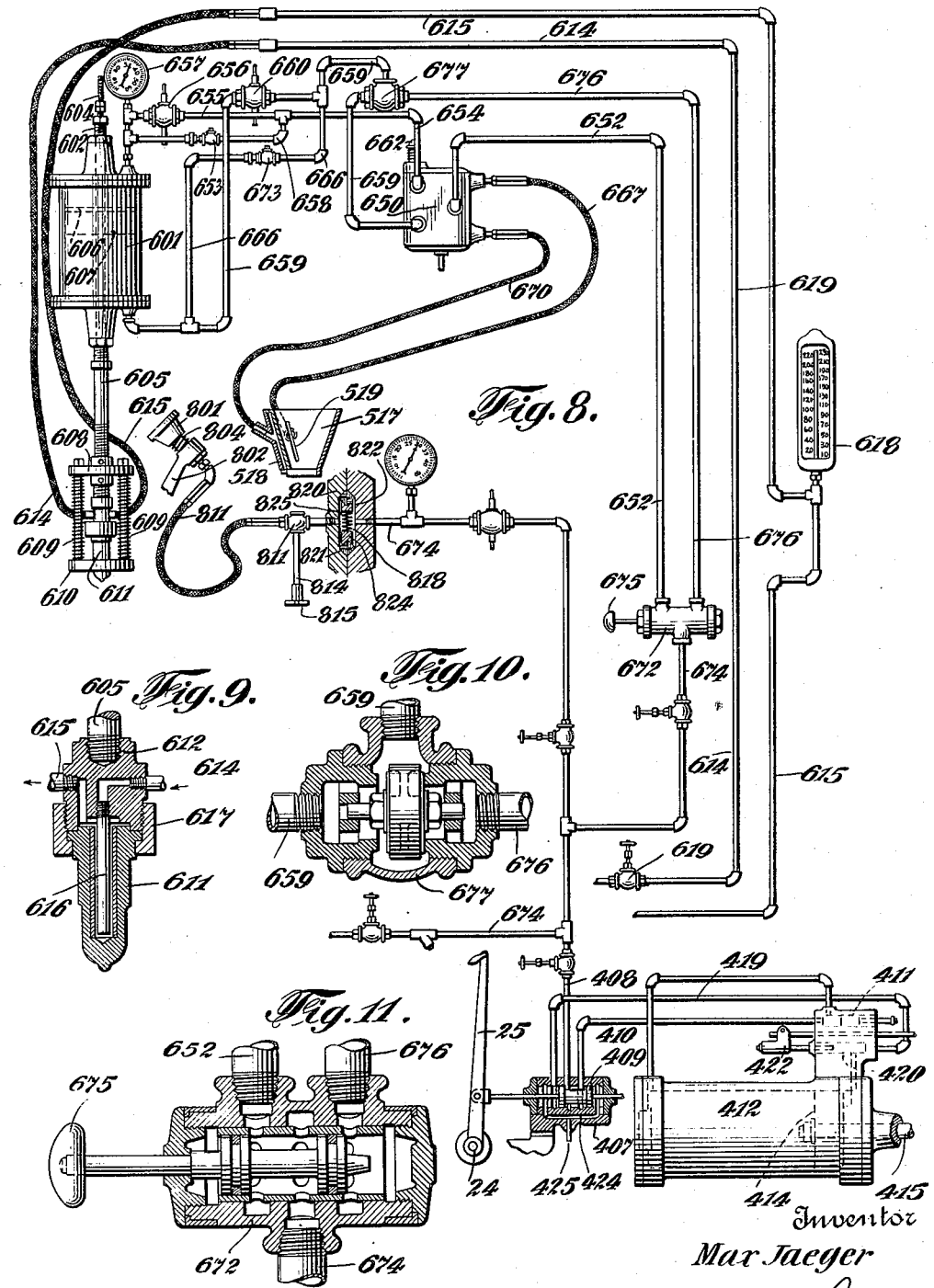

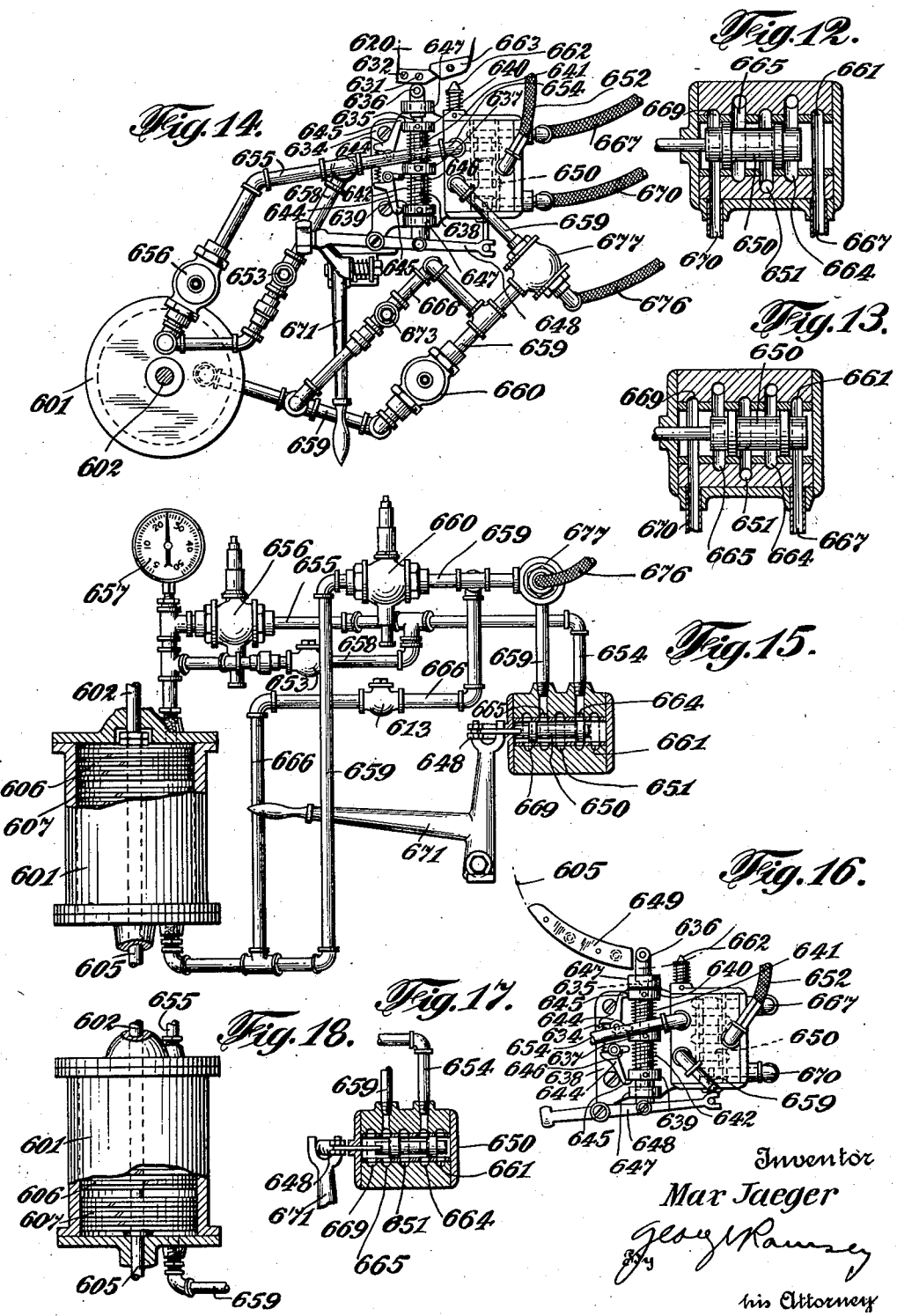

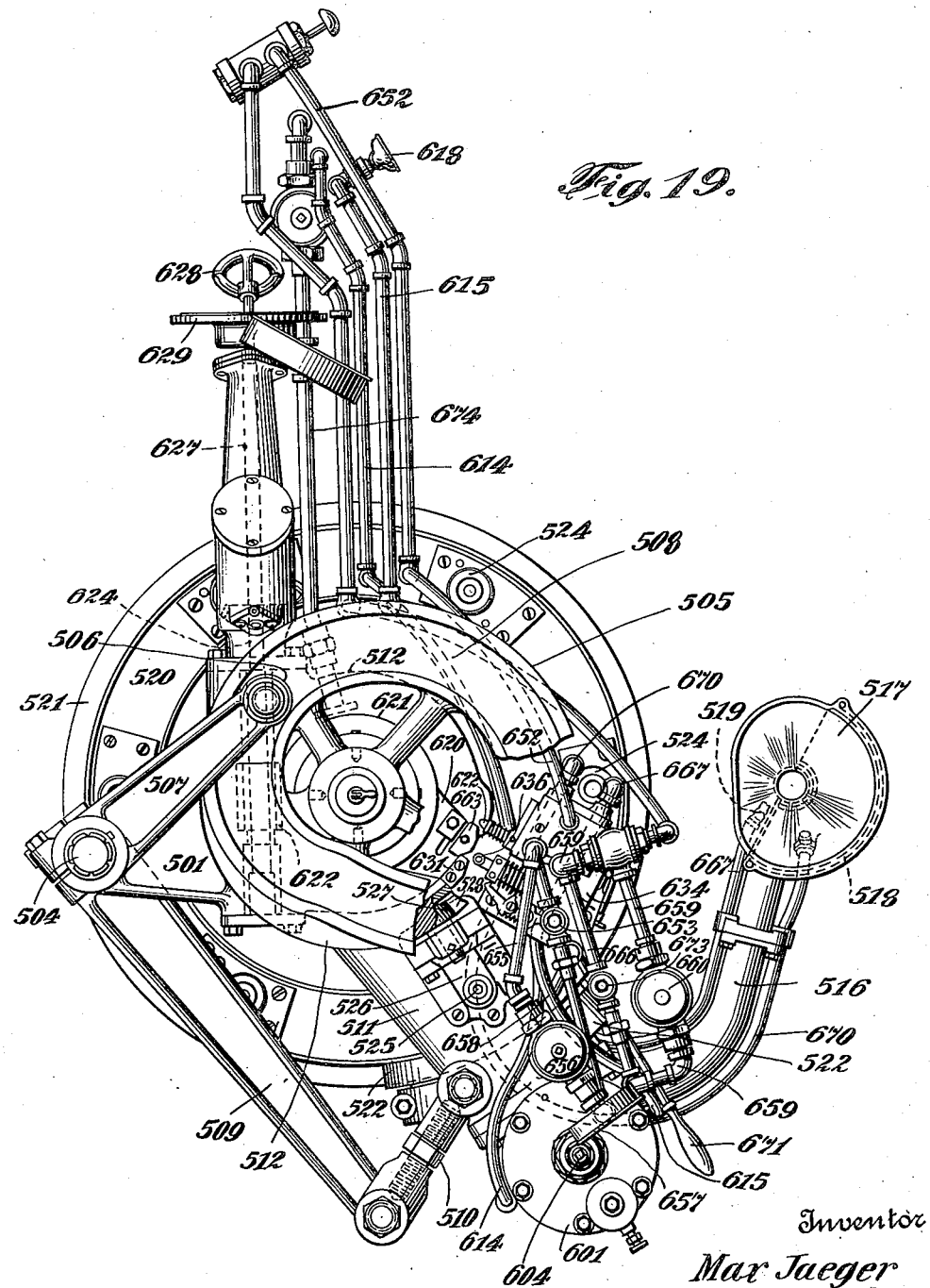

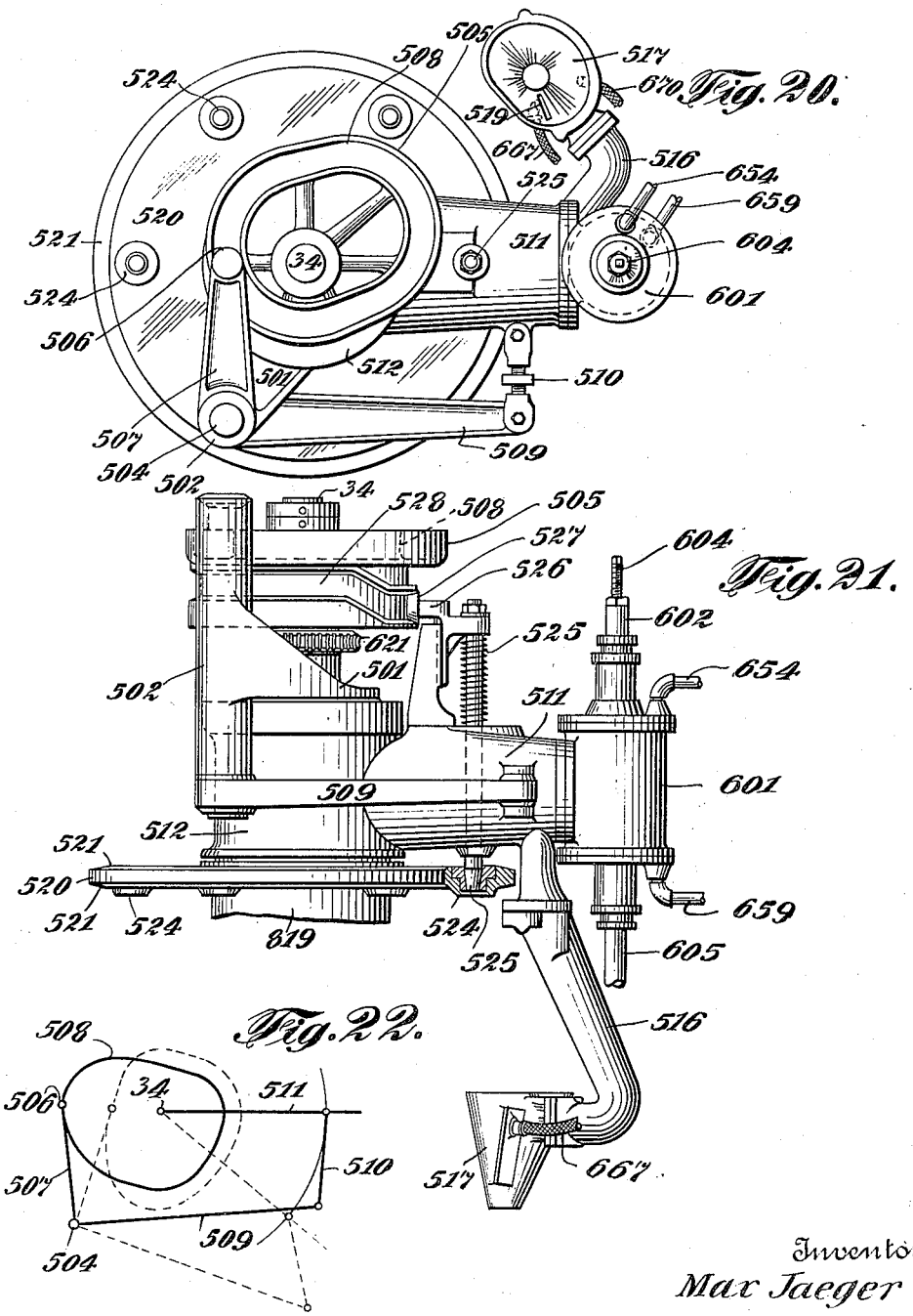

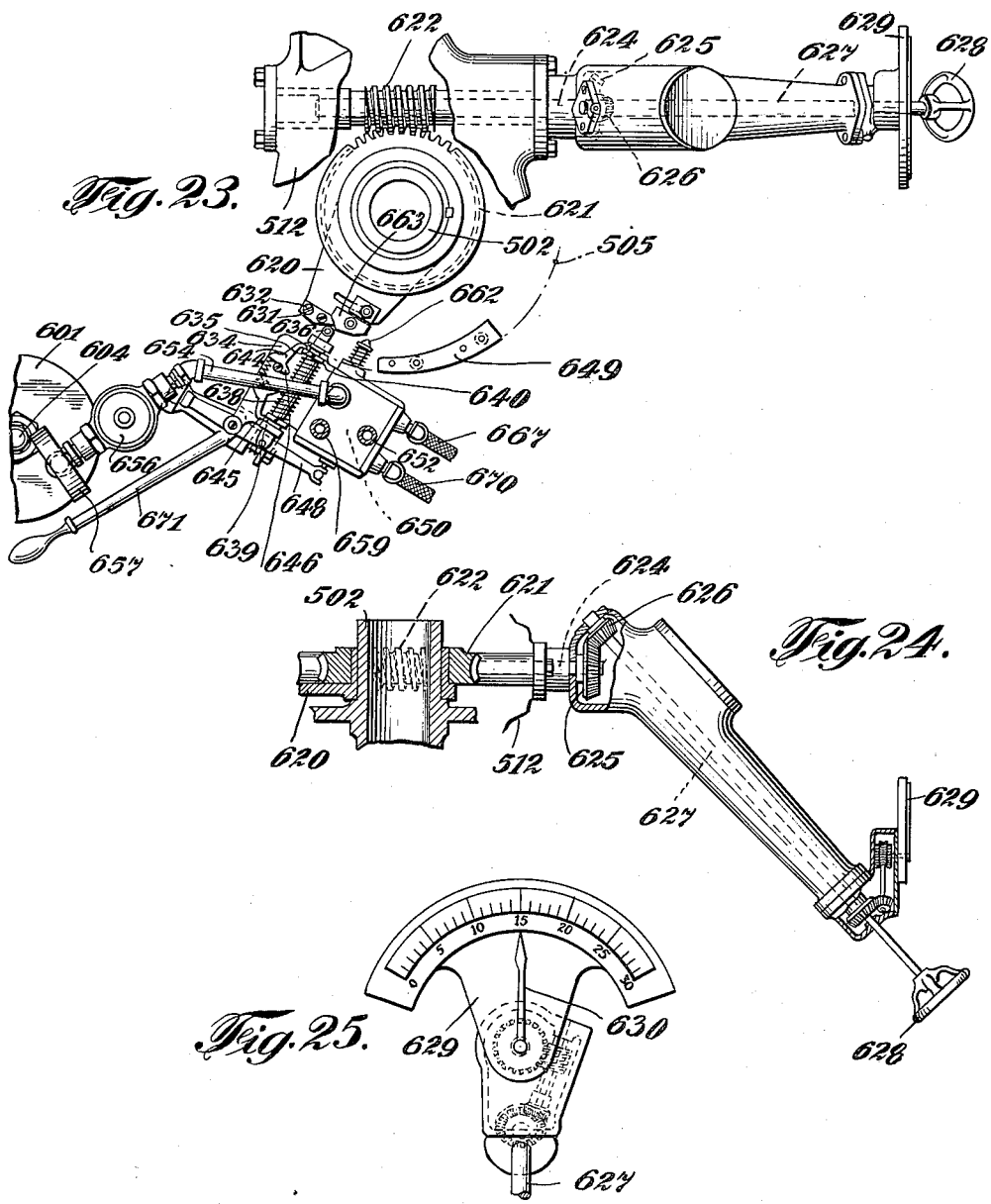

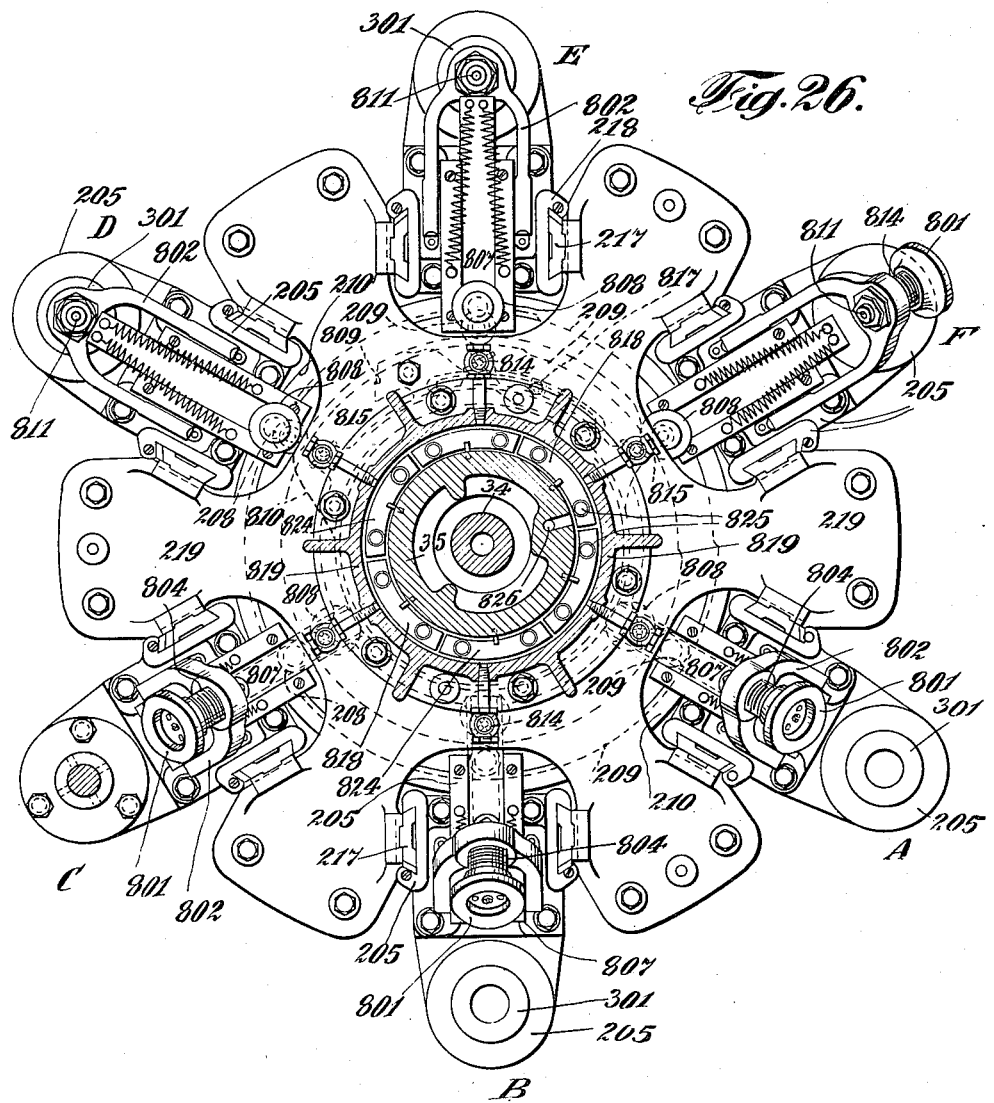

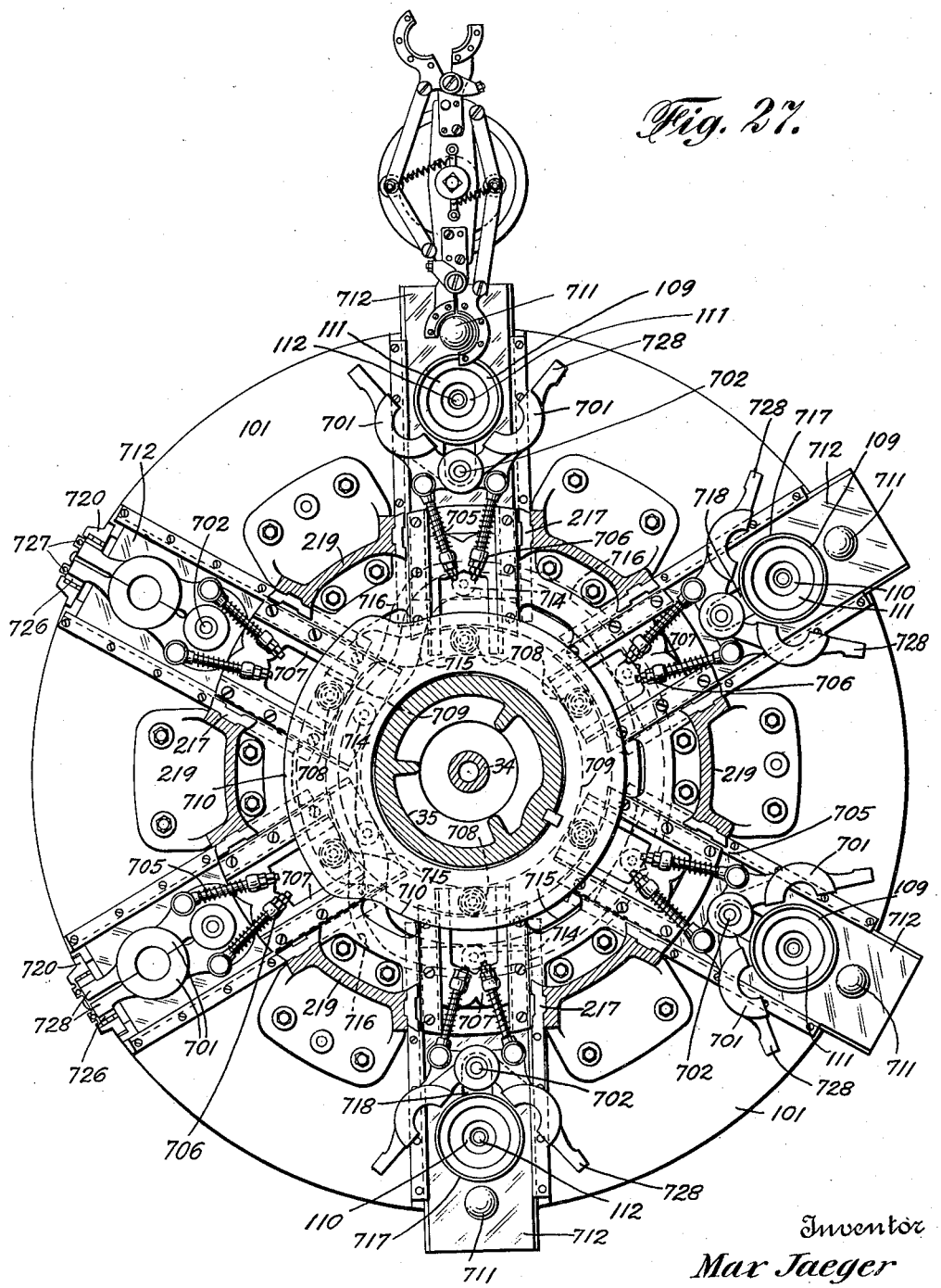

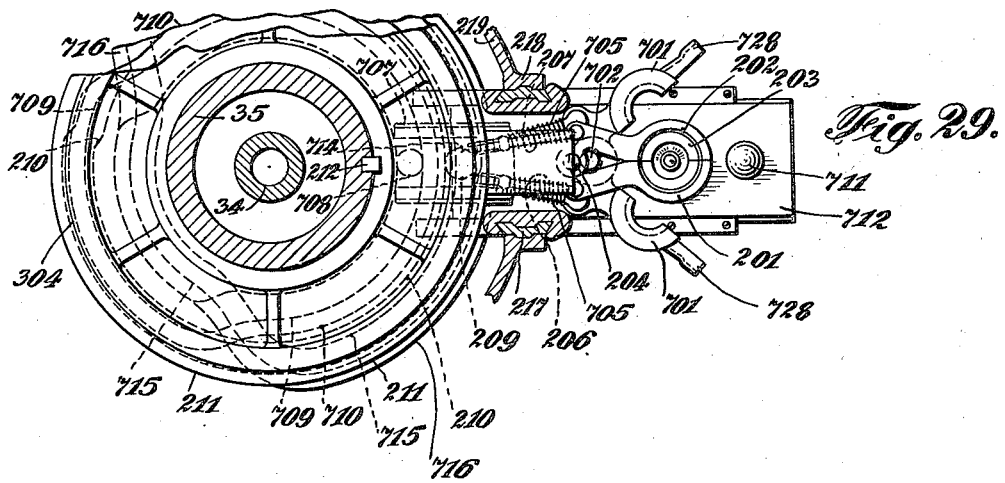
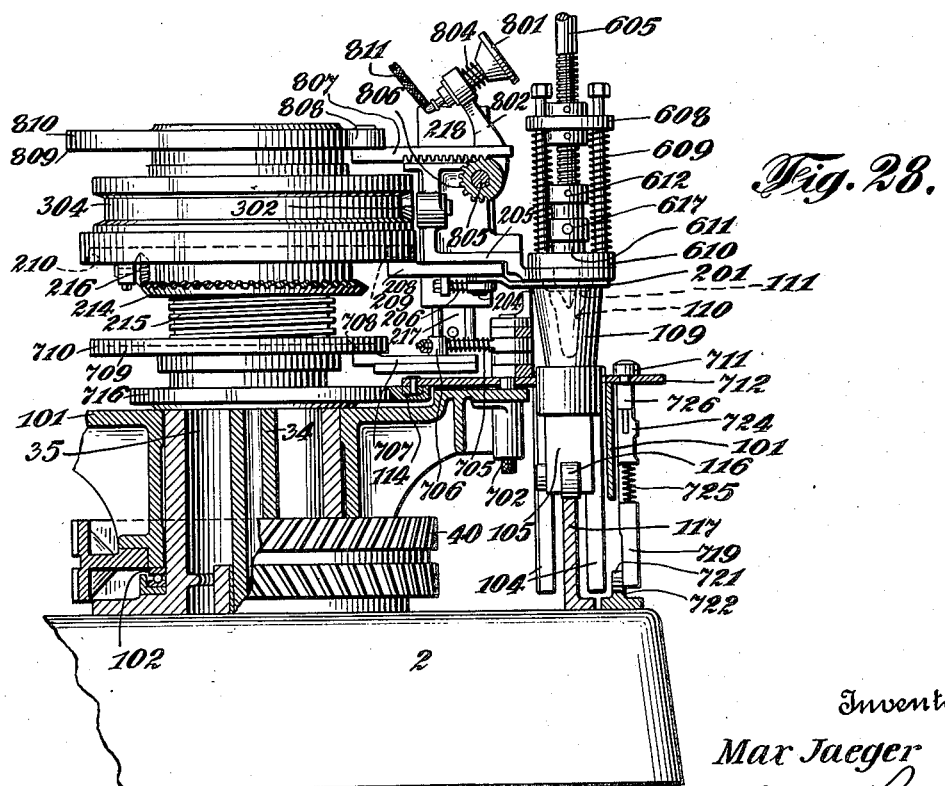

Aug. 13, 1929.  M. JAEGER  1,724,483
GLASS PRESSING AND BLOWING MACHINE
Original Filed April 17, 1922   23 Sheets-Sheet 14
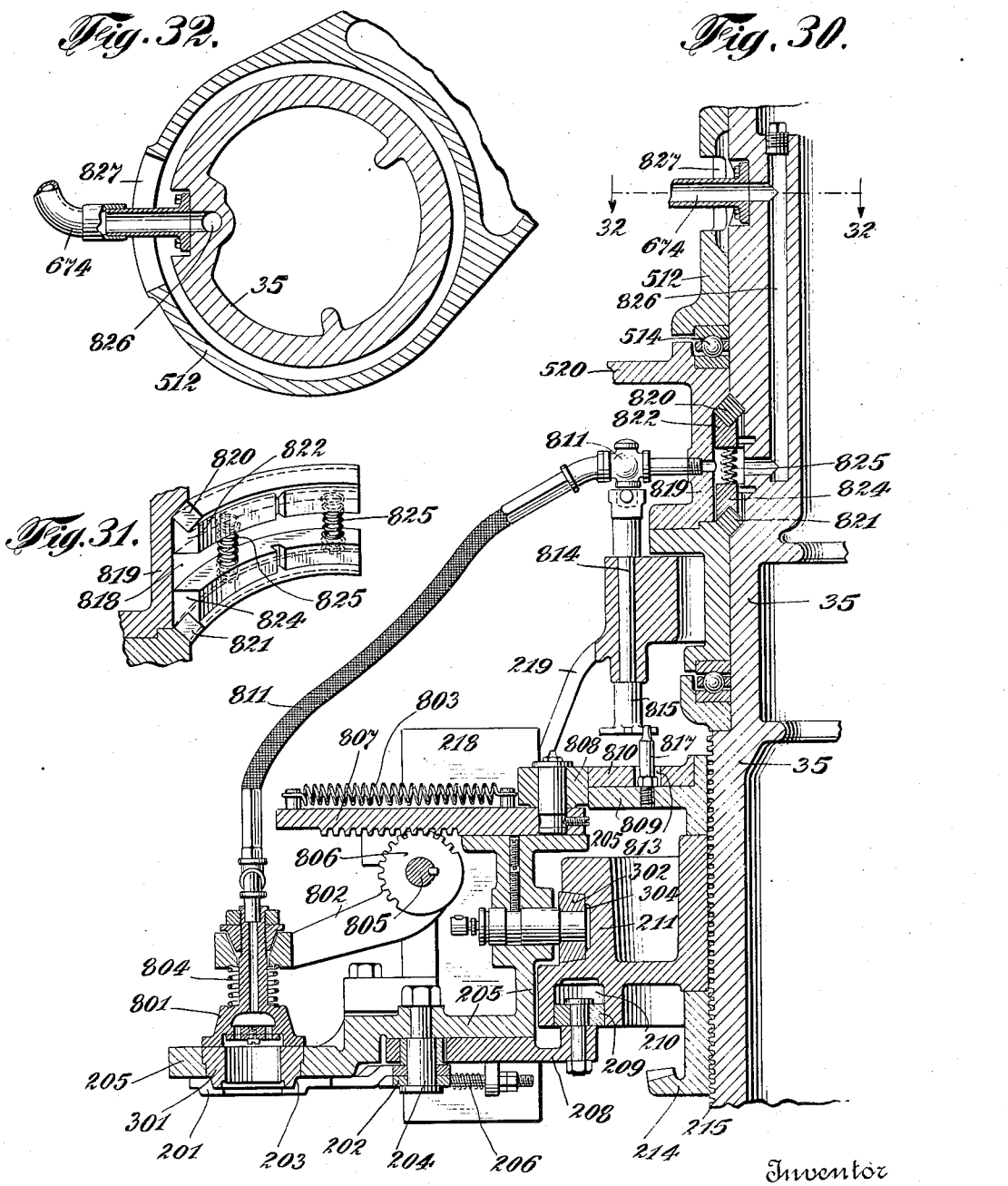

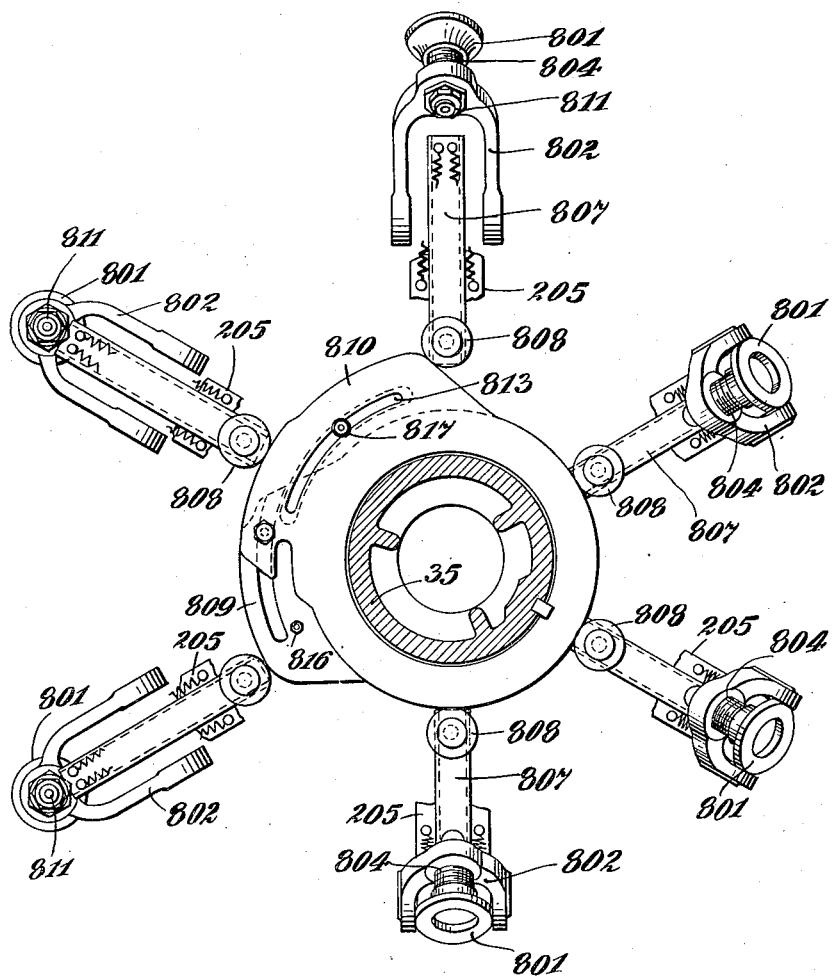

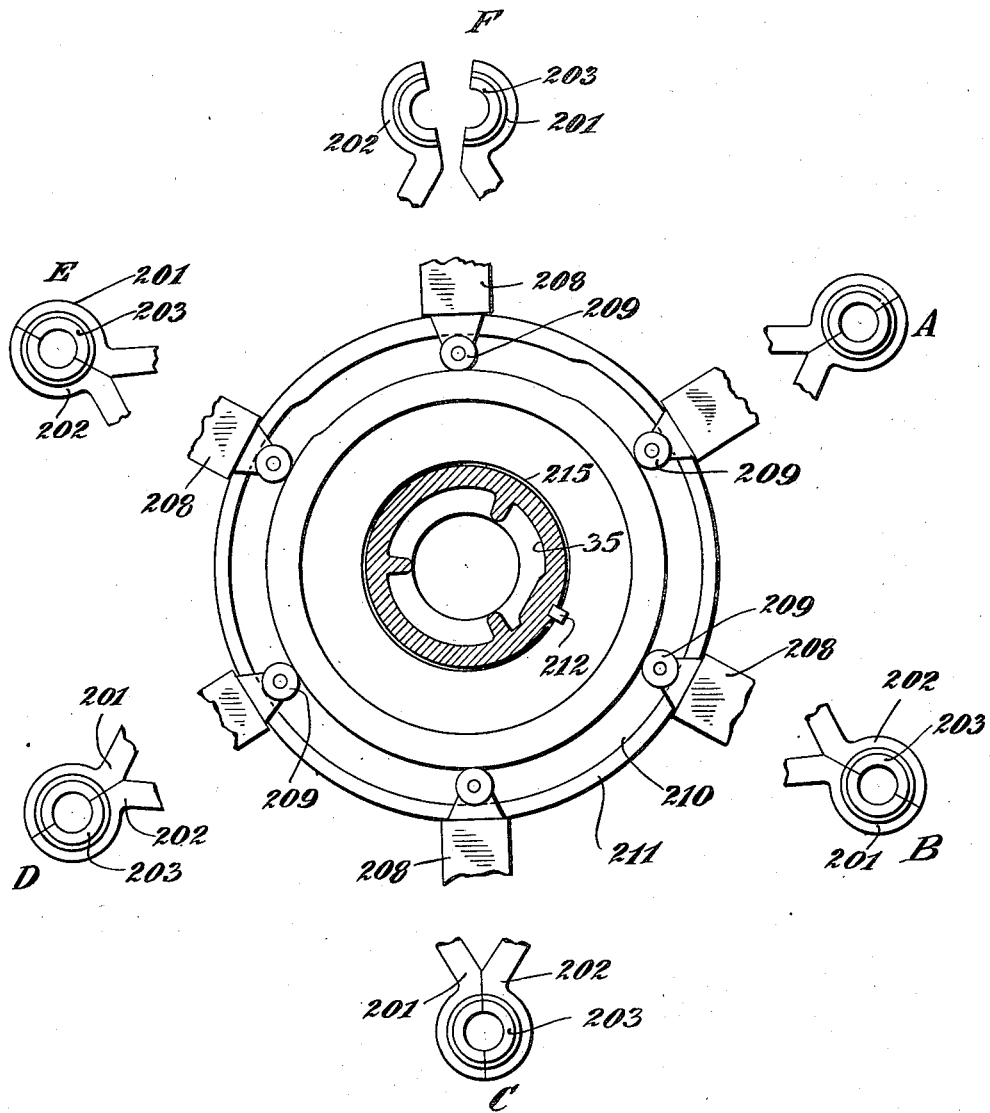

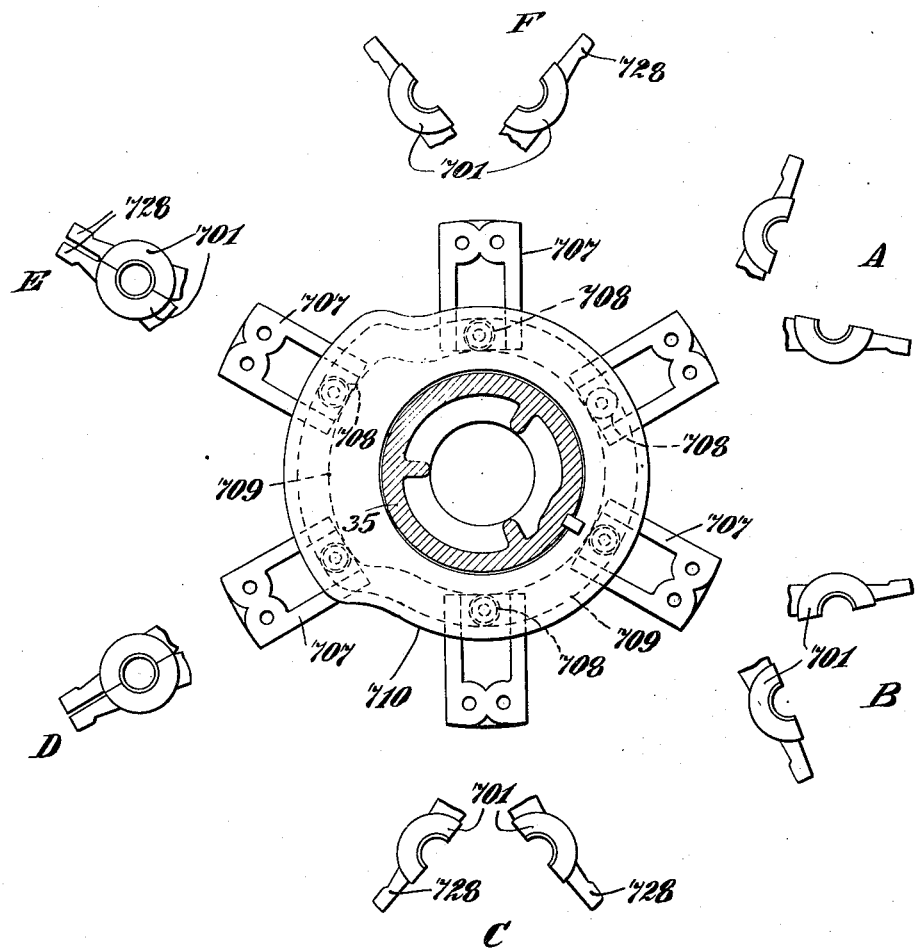

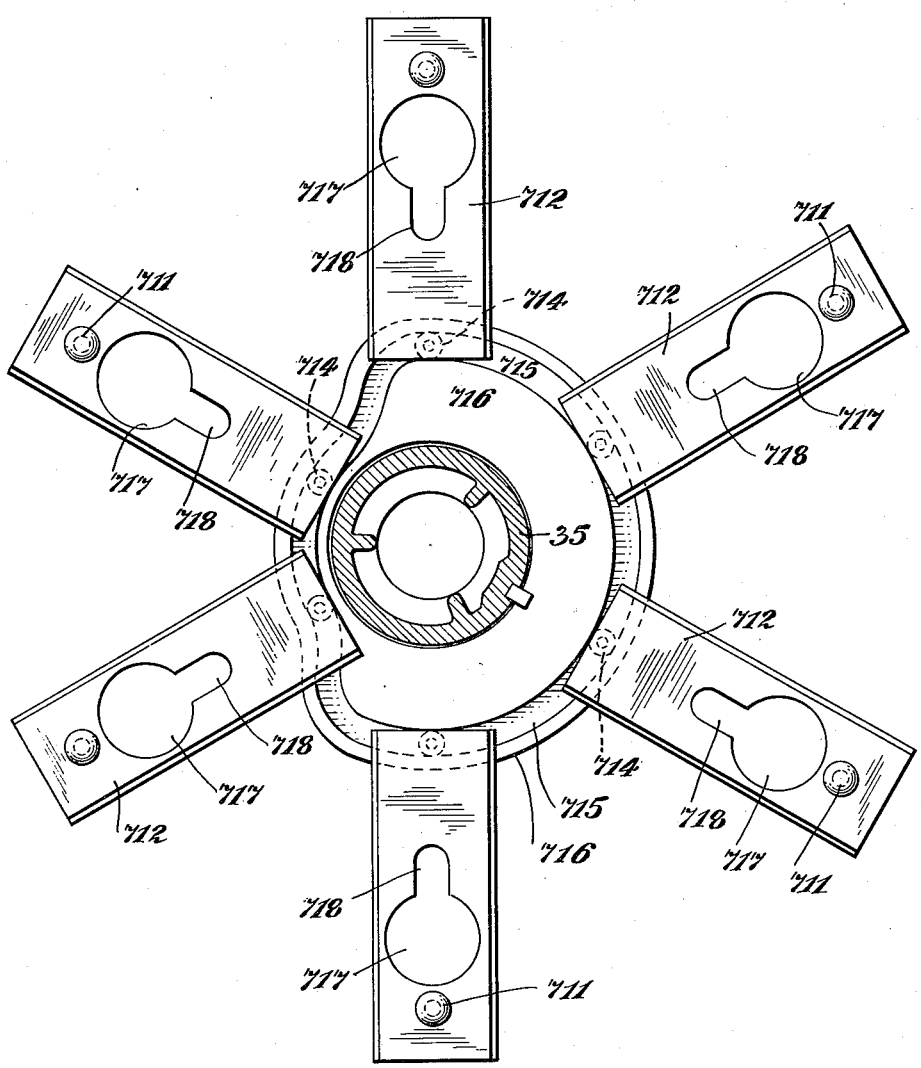

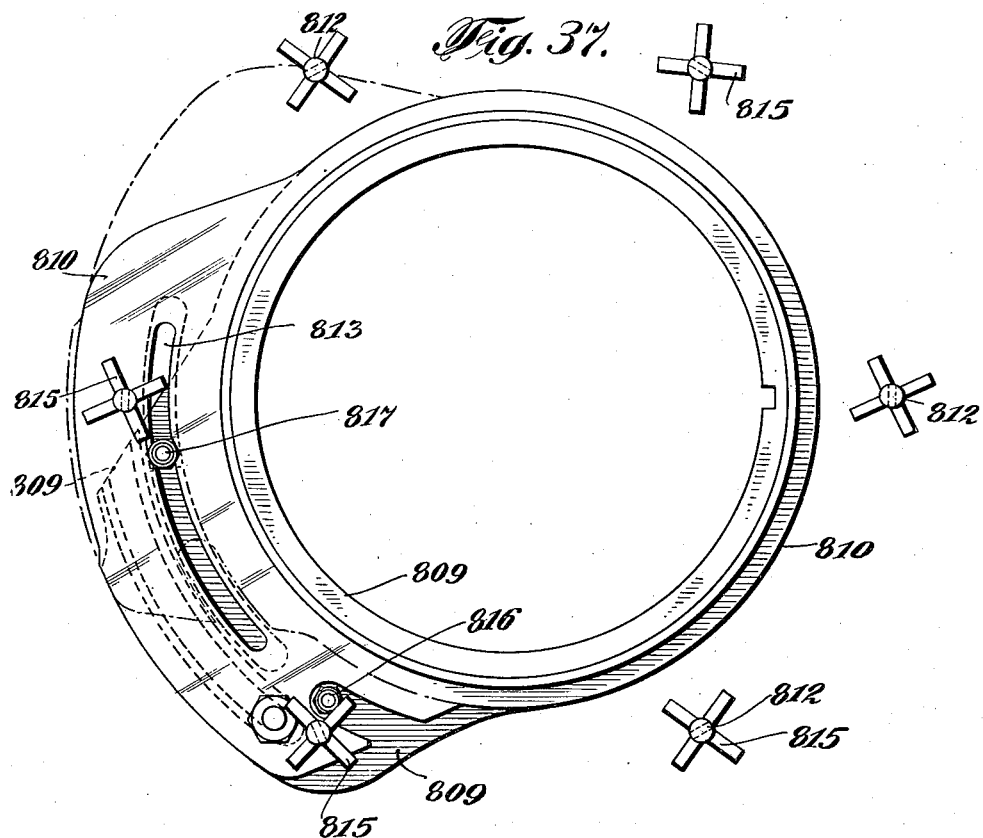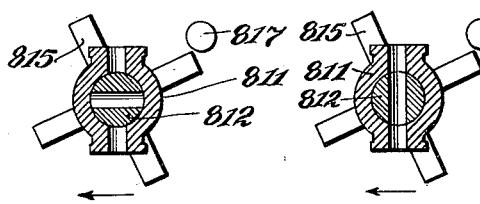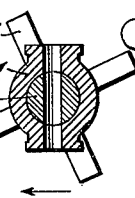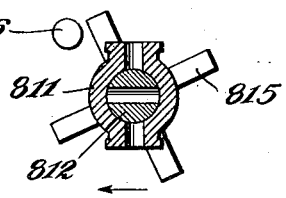

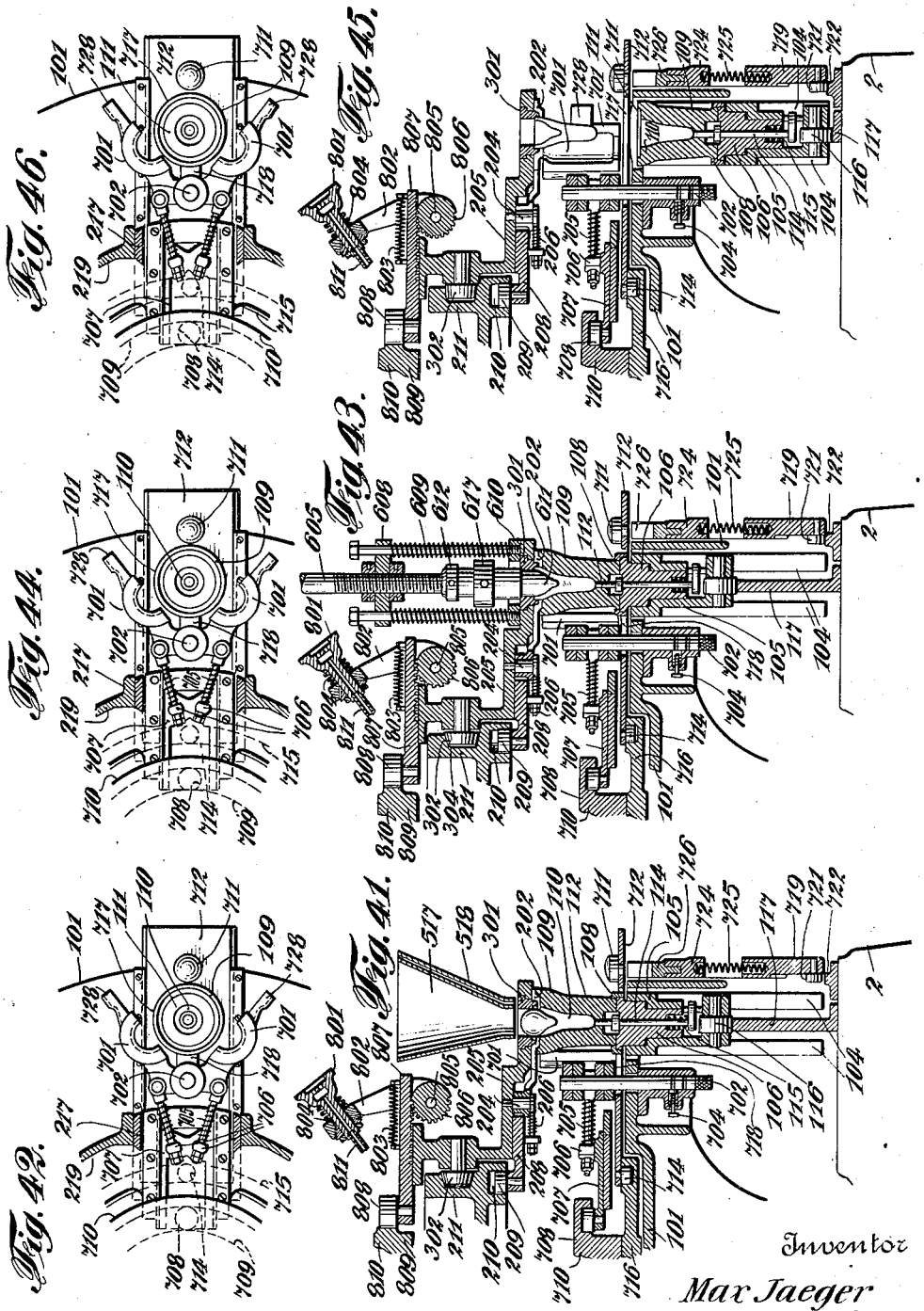

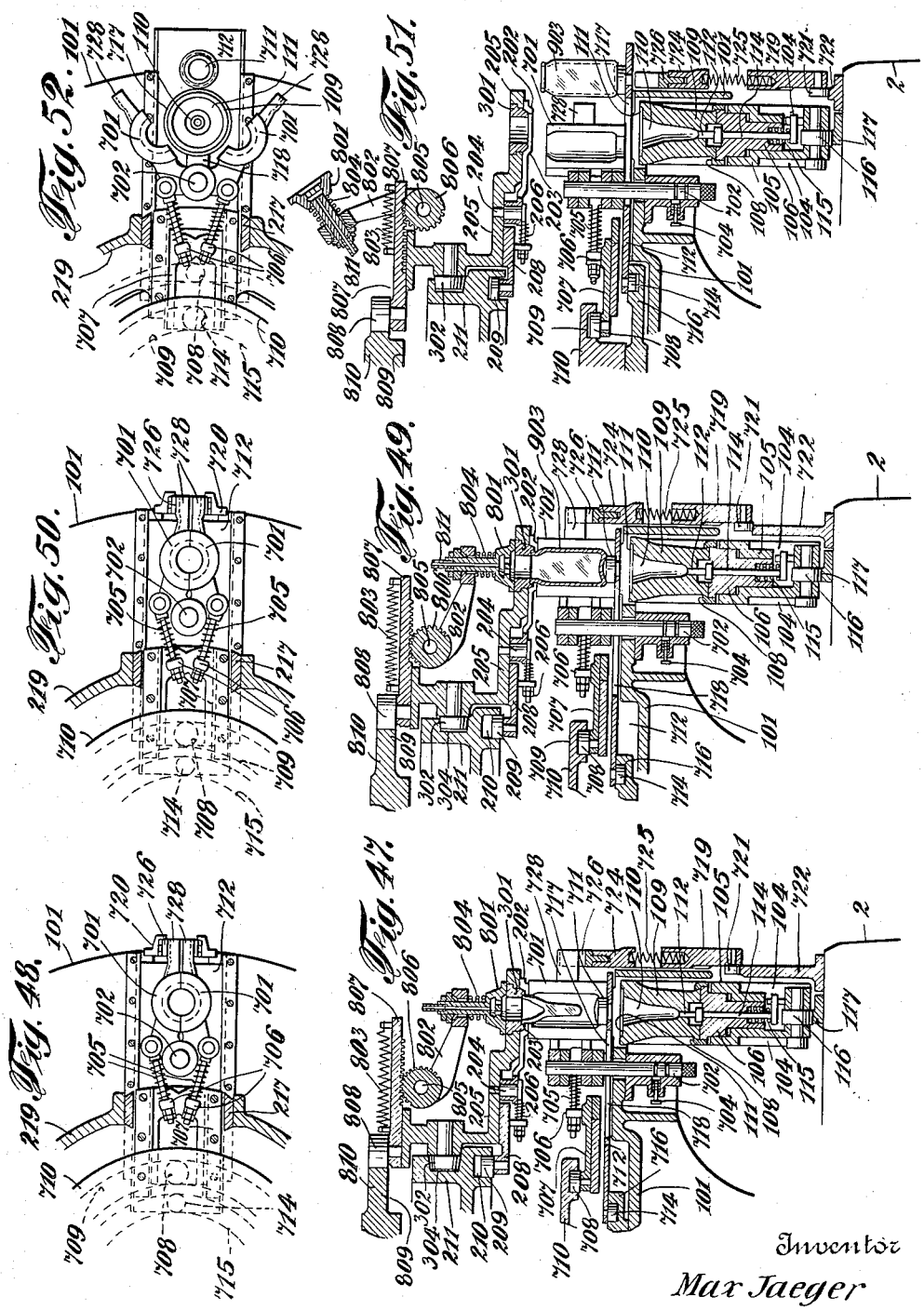

Aug. 13, 1929.  M. JAEGER  1,724,483
GLASS PRESSING AND BLOWING MACHINE
Original Filed April 17, 1922  23 Sheets-Sheet 22

Inventor
Max Jaeger
By George Ramsey
his Attorney

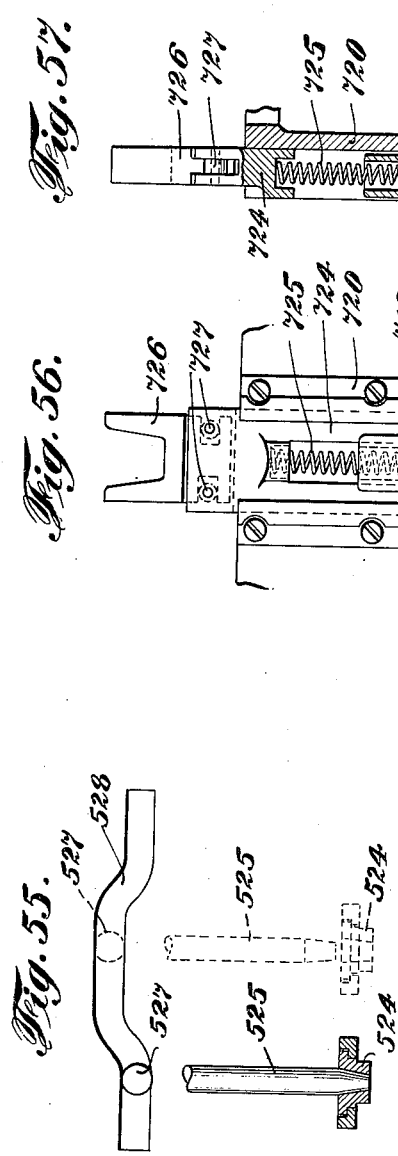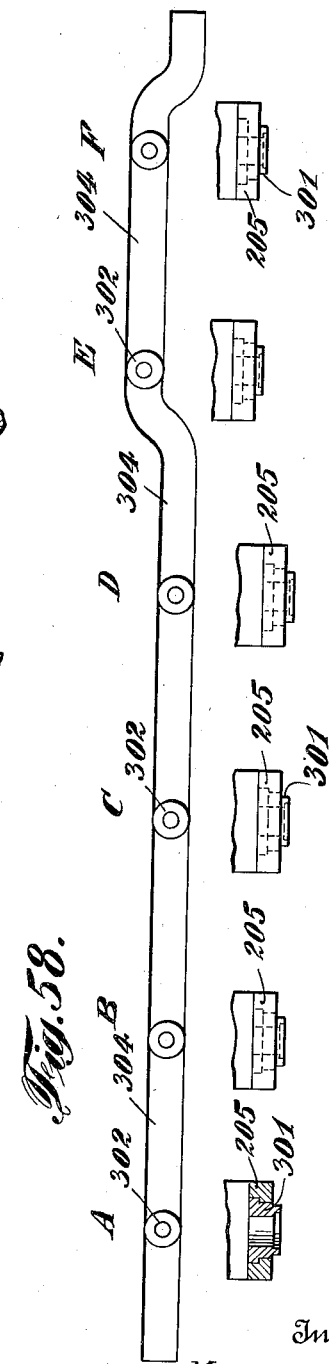

Patented Aug. 13, 1929.

1,724,483

UNITED STATES PATENT OFFICE.

MAX JAEGER, OF LONG ISLAND CITY, NEW YORK, ASSIGNOR TO ANCHOR CAP & CLOSURE CORPORATION, OF LONG ISLAND CITY, NEW YORK, A CORPORATION OF NEW YORK.

GLASS PRESSING AND BLOWING MACHINE.

Original application filed April 17, 1922, Serial No. 553,900. Divided and this application filed August 8, 1924. Serial No. 730,838. Renewed April 12, 1927.

This invention is a division of my application Serial No. 553,900 filed April 17, 1922, relates to the glass art, and more especially to an automatic pressing and blowing machine.

Heretofore in the art the most common type of pressures has been of the stop and start type; that is, the mold table had an intermittent movement so that the whole mass of metal, comprising all the revolving parts of the machine, was stopped and started for each piece of ware manufactured. This motion imposed a very heavy duty upon the driving mechanism as well as on the press, because of necessity these very heavy parts had to be started, moved, and stopped at very small intervals of time when a machine was delivering many pieces of finished glassware per minute. This stopping and starting rendered the load condition on the driving forces very unsatisfactory because at one time there was no load,— as when the press is stationary,—and at the next instant the load was exceedingly heavy. If several machines were operating in unison this load disturbance was pyramided. Since several machines other than presses were usually run from the same driving plant this variable load factor disturbed the operation of other machines, unless the operating power was so powerful as to be inefficient and wasteful in operation. The jerky motion also jerked the glass charges around in the mold and under certain conditions introduced defects in the ware. Furthermore, such a type of machine naturally required constant repairs because of loosening of parts and breakage.

It has also been the practice in the art to provide complicated mechanisms for transferring the charge from the press mold to the blow mold. In many cases this was done by an inversion method where the charge was inverted either in one step or the other. This was liable to change the shape and condition of the glass and produce defects in the ware. Various types of split press molds have been in use but these molds leave seams in the finished ware where the split press mold parts meet. This is due to the very sensitive character of the glass when it leaves the feeder and before a thick n is formed on the charge. Further- more, complex transferring mechanisms increase the weight of moving parts and slow up the machine.

Where automatic feeders have been used it has been the usual commercial practice to drive the feeder independently of the press. This has made it necessary to coordinate two separately driven machines to secure a common timing for the interval when the glass is delivered from the feeder to the press. There are times when it is necessary to change the rate of the feeder and there are times when it is desirable to change the rate of the press. These changes may be desirable simultaneously, or, either the press or the feeder may require the change. However, in any case where a change is made in either the feeder or the press as to the rate of charges delivered or the rate of finished ware produced, a corresponding change must be made in the other machine. Where the two machines have independent drives any change requires double manipulation and adjustments which must properly time the feeder and press at the new rate before ware can be made.

It has also been the usual commercial practice to remove the ware by hand from the machines, except in cases where the ware is dumped by the machine into a chute and permitted to slide by gravity. Hand handling of the hot ware is apt to distort the portion grasped by the hand tongs and this is ruinous to finishes which must be accurate, such as is required by the modern packers' sealing machines. The gravity chute method is satisfactory for certain ware such as beverage bottles, but is not satisfactory for fine ware.

The machine embodying the inventions hereinafter specified comprises a continuously rotating mold table having a constant speed of rotation, except when the speed is changed for adjustments, and wherein the feeding, pressing, blowing, and delivering operations are all performed without in any way changing the speed of rotation of the machine. Under these conditions the load is very even and the machine operates with minimum shock and jars. The power consumed is very light and since no abnormal load is produced a constant and efficient drive is the result.

The charge transferring devices are simple and are so located that the charge is not disturbed or marred during or after pressing. The parts are compact and therefore the machine occupies small floor space.

The take-off mechanism is automatic and is driven by the power drive for the press so that the take-off is at all times coordinate with the press, and as each type of ware has a special form of ware-holder, the ware is not injured or damaged in the taking off operation.

The machine embodying the present invention may be generally described as comprising a base frame upon which all the mechanisms except the feeder are mounted. This base frame carries a central column which is a mast around which the machine is built. The mold table revolves around this column and carries press molds and blow molds. The press molds rise through the mold table between the members of the split blow-molds and receive the glass charge which is dropped from the feeder into a funnel that at the feeding moment is moving clockwise with the mold. When the mold is fed the funnel leaves the mold and moves counter-clockwise to a point slightly beyond the path of the falling charges, where the funnel is positioned over the next mold in the series and the cycle of feeding is repeated when the mold comes under the feeder. A pressing plunger which travels with the funnel is positioned over the mold previously charged when the funnel is positioned over the succeeding mold. Suitable ring molds are brought into cooperation with the press mold before the plunger descends. During the pressing operation the plunger and funnel both travel with their respective molds. In the machine there are a plurality of groups of mold members carried by the mold table and but one funnel and one plunger to serve these molds. The mold table, therefore, continuously rotates while the funnel and plunger oscillates. When the pressing operation is completed the neck of the ware is formed to overhang a split ring mold and then the plunger rises and the solid block pressing mold descends, leaving the charge suspended from the neck ring mold. After the descent of the pressing mold a slide brings the bottom of the blow mold into place beneath the charge and a blow mold then closes around the charge. A blow head descends upon the ring mold and air is admitted to the blow head, thereby blowing the charge into a finished article. The blow head then rises slightly and continues to blow cool air into the blown article, thereby gently cooling the hot glass. The blow mold now opens, the bottom slide moves out and carries outwardly the finished piece of ware. An automatic take-off comprising a pair of spring operated jaws then grasps the ware and removes the ware from the slide by a circular and, at the same time, lifting motion so that the ware is elevated slightly as it is removed from the bottom of the blow mold. At the next station the press mold rises and the cycle is repeated. In the machine herein disclosed there are six mold stations on the mold table and six cycles performed during one complete rotation of the mold table.

Realizing that the present inventions may be embodied in constructions and devices other than those herein described and shown it is desired that the disclosure shall be considered as illustrative and not in the limiting sense.

Referring now to the drawings forming a part of this specification, like characters will be used through the several figures to represent like parts.

Figure 2 is an elevational section view;

Figure 3 is a plan view of the driving shafts;

Figure 4 is a detail view of the clutch mechanism;

Figure 5 is a detail view of the drive to the vertical main shaft;

Figure 6 is a detail view of the mechanism for withdrawing the press from position beneath the feeder;

Figure 7 is a diagrammatic view showing the press drive, driving the feeder;

Figure 8 is a layout of the control pipes;

Figure 9 is a sectional view through the plunger;

Figure 10 is a detail view of a reducing valve;

Figure 11 is a detail view of a control valve;

Figures 12 and 13 are sectional views of the control valve for the press plunger;

Figure 14 is a plan view of the pipe connections to the pressing cylinder;

Figure 15 is an elevational view of the parts shown in Figure 14;

Figure 16 is a detail of the operating cam for the control;

Figure 17 is a detail of the control valve shown in Figures 12 and 13 and illustrates the service pipe connections;

Figure 18 shows the pressing cylinder;

Figure 19 is a plan view of the pipe lines and the guiding funnel;

Figure 20 is a plan view of the funnel cam and pressing plunger;

Figure 21 is an elevational view of the parts shown in Figure 20;

Figure 22 is a diagrammatic view of the movements of the plunger and the guiding funnel;

Figure 23 shows the adjustments for the control cam;

Figure 24 is an elevational view of the detail shown in Figure 23;

Figure 25 illustrates the indicator scale for the control adjustments;

Figure 26 is a sectional view taken above the blow heads and shows the positions thereof;

Figure 27 is a sectional view taken above the blow molds and illustrates the position of these molds;

Figure 28 is a detail showing the presser plunger in operation;

Figure 29 is a plan view of a single mold showing the ring mold closed and the blow mold open;

Figure 30 is a detail showing the wind chest and the blowing operation;

Figure 31 is a detail of the wind chest packing rings;

Figure 32 is a sectional view through line 32—32 on Figure 30;

Figure 33 is a diagrammatical view of the operation of the blow heads and cam therefor;

Figure 34 is a diagrammatic view of the ring mold and cam therefor;

Figure 35 is a diagrammatic view of the blow mold and cam therefor;

Figure 36 is a diagrammatic view of the slide plate and cam therefor;

Figure 37 is a diagrammatic view of the star wheels for operating the blow valves and the operating pins therefor;

Figures 38, 39 and 40 show the blow valves and operating pins in several different operative positions;

Figure 53:
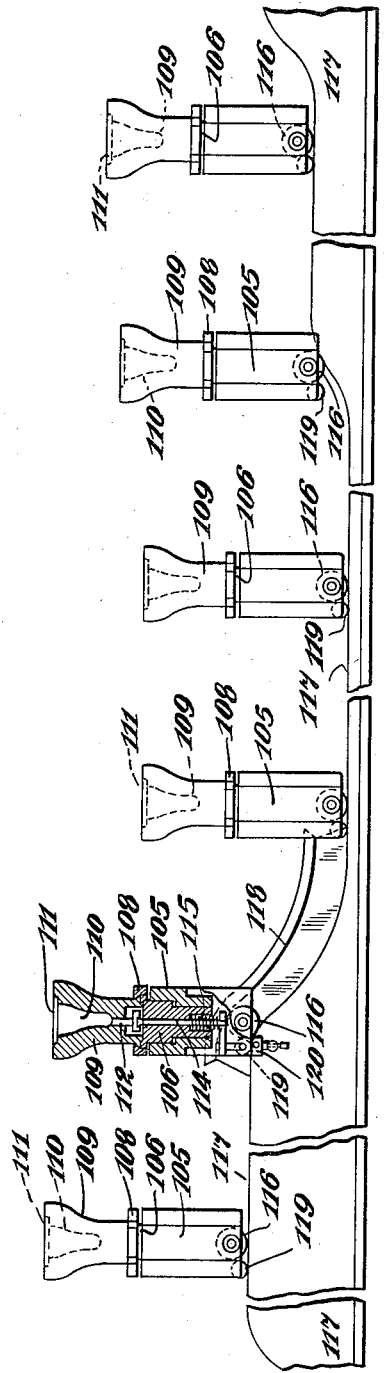
Figure 54:
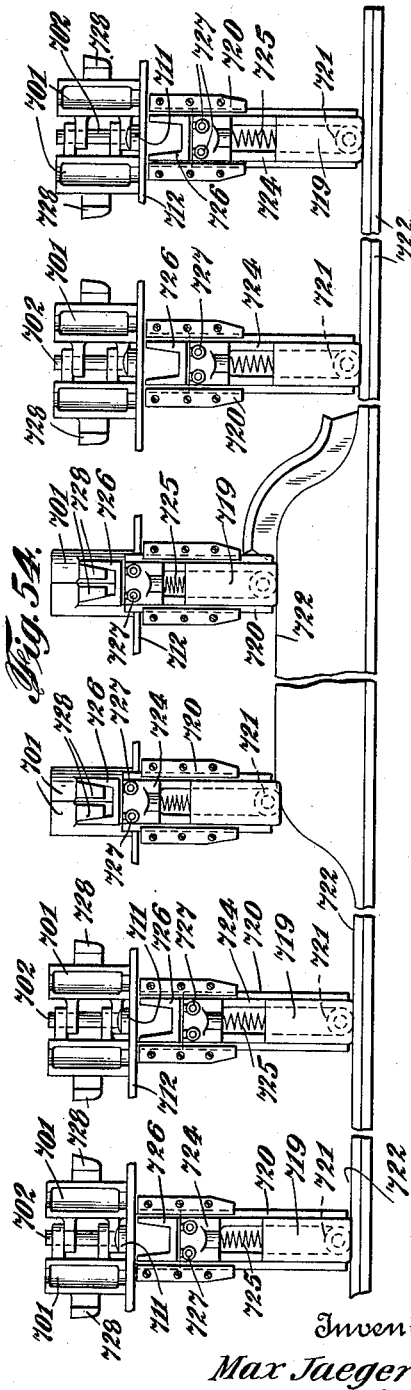

Figures 41 to 52 inclusive are alternate plan and corresponding elevational views of a complete cycle of a single mold from receiving the charge to discharging the completed ware;

Figure 53 is a view showing a complete cycle of movement of a press mold;

Figure 54 is a view showing a complete cycle of movement of the blow mold lock;

Figure 55 illustrates the cam for operating the locking pin to lock the press mold directly under the press plunger;

Figures 56 and 57 are details of the press mold lock; and

Figure 58 is a detail of the solid ring lifting cam.

Reference will now be made to specific constructions embodying the invention which will be described in detail.

*Main drive and main frame.*

In view of the fact that it is desirable to be able to regulate the speed of operation of the machine, it is necessary that a variable speed drive be provided and this is accomplished by means of a variable speed motor 1 which is mounted on the main frame 2 and is connected by shafts 4 and 5 together with suitable connecting gearing 6 with a control wheel 7 so that the field of the motor may be controlled in such manner as to obtain a relatively large range of speed. The particular speed for which the motor is set to run is indicated on the dial 8 which faces the control handle wheel so that an operator manipulating the wheel may observe the needle on the dial to determine the speed at which the motor is being set to run.

The motor shaft carries a pinion 9 which meshes with a gear 10 that is mounted on the stub shaft 11. A gear 12 on the stub shaft 11 is in engagement with a gear 13 on a front section of the main shaft. The stub shaft 11 also carries bevel gear 14 which meshes with the bevel pinion 15 on the hand driven shaft 16 which permits the operator to place a crank on the squared portion 17 and thereby turn the machine by hand when desired. The hand driven mechanism runs idly when the machine is driven by the motor. The front section of the main shaft carries one half of a disk clutch member 18 and the main drive shaft 19 carries the other half of the disk clutch. This disk clutch is adapted to be operated by the lever 20 which is operated by pinions 21 and 22 on the control shaft 24 which carries the main control hand lever 25 so that when this lever is operated the disk clutch may be opened or closed to connect or disconnect the main shaft 19 from the motor drive. The main shaft carries a bevel pinion 26 which connects with a corresponding pinion 27 on the shaft 28 that carries a worm 29 which drives the worm wheel 30 that operates the take-off mechanism.

The main drive shaft 19 also carries a large worm 31 which engages the main drive worm wheel 32 that is mounted on the vertical main shaft 34. Referring to Figures 2 and 5 it will be noted that the vertical main shaft extends upwardly through the column 35 which is fixedly mounted upon the main frame 2. The vertical main shaft 34 carries a reduction gear 36 that meshes with a larger gear 37 on the vertical countershaft 38 which also carries on its upper end a pinion 39 that engages a mold table drive gear 40 so that the mold table is continously rotated when the main shaft 19 is driven.

Referring now to Figures 3 and 4, it will be noted that the front main shaft which rotates whenever the motor is running, carries a gear 41 which engages a gear 42 on the glass feeder shaft 44. This gear 42 carries one part of a simple spiral clutch 45. The main drive shaft 19 runs at a relatively high speed as compared to the speed necessary to operate the timer for the glass feeder to enable the feed to deliver glass at the proper rate for the press. When the press is stopped and withdrawn from the feed, as will later be explained, it is desirable to run the feed at a higher rate so that small charges will be dropped in a suitable cullet trough. When the press is operating, however, and the drive for the press is driving the feeder, it is desirable to take the power for the feeder from a high speed main shaft, thus avoiding irregularities in speed which might be due to press operation, and a reduction gearing is introduced as a means for obtaining the proper speed for the feeder control drive. This is accomplished (Figures 3 and 4) by the gear 46 on the main drive shaft 19 which meshes with a gear 47 on the slidable frame 48, that slides upon the base 49 when the clutch lever 20 is actuated because this clutch lever 20 is connected to the frame 48 by a lever 50 of the second class which is pivoted at 51 to the base 49. The gear 47 is connected to a revolving head 52 mounted to revolve on the shaft 44. This head carries planetary gears 54, the larger of which meshes with the stationary annular gear 55 and the smaller of which meshes with the annular gear 56 that is attached to the outside annular gear 57. A pinion 58 is carried by the short shaft 59 mounted in the frame 48, which shaft carries another pinion 60 on its outer end. This pinion 60 meshes with the small pinion of the double reduction gear 61 that is also mounted upon the frame 48. The larger member of the double reduction gear 61 meshes with a pinion 62 secured to the shaft 44. By this construction it will be noted that when the clutch lever 20 is operated to open the disk clutch the positive clutch 44'—45' drives the feeder shaft 44 and the frame 48 has been moved forward to disengage the gear 46 from meshing with the gear 47. However, when the clutch lever 20 is operated to close the disk clutch then the positive clutch 44'—45' is opened and the gears 46 and 47 are in mesh. Power from the main shaft 19 is transmitted to the gear 46 and from it to the gear 47, which drives the revolving head 52 and causes the planetary gears to travel around the stationary annular gear 55. This motion causes the planetary gear to transmit a slow speed to the annular gear 56 dependent upon the ratio of teeth in these several gears. Power is then transmitted from the annular gear 57 through the gears 58, 59, 60 and 61 to the pinion 62 on the feeder shaft 44. This feeder shaft is formed in several sections connected together with pairs of bevel gears and finally is connected by a universal coupling 64 with a shaft 65 that extends parallel to the track of the machine. This shaft 65 has a sliding key drive engagement with the sprocket wheel 66 that is secured to the stationary post 67. The sprocket carries a silent chain 68 which drives the feeder control 69. This chain drive, operated by the sliding shaft permits the machine to be withdrawn from beneath the feeder without breaking the drive to the feeder.

The main frame 2 rests upon track wheels 70, which are adapted to roll upon rails 71 so that the machine may be moved toward or from the feeder, as is necessary or desired. It will also be noted that the switch-board 72 adjacent the motor is connected to the control switch 74 for the motor by suitable conduit 75.

*Mold table and block mold.*

The press or parison mold mechanism which is of the block mold type, is shown more especially in Figures 2 and 53. The mold table drive gear 40 is carried by the lower portion of the mold table 101 which is supported upon the ball-bearing 102 and is mounted to rotate around the column 35. At suitable intervals around the mold table, mold stations are mounted at 60 degree intervals so that in the present construction there are six stations. These stations are all duplicate mechanisms so that in describing the several mold elements only one station need be referred to, it being understood that the same elements are duplicated at the other five stations. The press or parison molds are arranged in guides 104 that are provided in the skirt of the mold table and these molds are adapted for vertical movement. The press mold construction comprises a carrier frame 105 in which is mounted a base block 106 that is held in position in a socket in the carrier frame by stub screw 107. The base block is connected by means of ring 108 to the block mold 109 which is provided with a mold opening 110 of the form desired for the glass and is also provided with a recess 111 which is adapted to receive the ring mold which will later be described. The block mold 109 is provided with a lift pin 112 that is operated by an actuating rod 114 that is normally retained in lower position by a suitable spring 115. The lower part of the carrier frame is provided with a carriage roller 116 which is adapted to roll on an annular cam track 117 as the mold table continuously rotates. This annular cam track causes the press molds to be raised and lowered during the rotation of the mold table and in Figure 2 the press mold on the right of the figure is in its highest position while the press mold on the left is in the lowest position. In order to insure the press mold being retracted at the proper time a retracting cam 118 is provided adjacent that portion of the annular track where the mold descends so that in case of sticking of the parts the mold is positively drawn downwardly. The actuating rod 114 is provided with a small cam roller 119 which engages the adjustable lever cam 120 which is set at the point where the parison mold starts to descend and at the proper time operates the actuating rod 114 to raise the lifter pin 112 and prevent the glass from sticking in the press mold when the mold descends. From the foregoing it will appear that the press molds may be easily detached from the carrier frame whenever it is desired to change the molds.

Split ring neck mold.

When the press mold is raised to its highest position the split ring mold shown more especially in Figures 2, 29, 30 and 34, is seated in the recess 111. This split ring mold, which forms the lower portion of the neck of the ware, and which supports the pressed charge when the press mold is lowered, comprises a pair of arms 201 and 202 on the outer end of which is formed the ring mold proper. The upper face of these arms is recessed at 203 to provide an interlock for the solid ring mold. These arms are pivoted on stub bolts 204 that are secured to the ring mold frame 205 that comprises a bracket which is L-shaped in cross-section and which is mounted to rotate with the mold table as will be more specifically explained later. The stub-bolts 204 are removable whenever it is desired to change the split ring molds.

Referring to Figure 29, it will be noted that the outer corners of the arms 201 and 202 are connected by spring links 206 and 207 with the side block 208 (Figs. 2 and 29) which carries a roller 209 that travels in the cam groove 210 (Figs. 2 and 29) in the ring mold cam 211, which is maintained against rotation relatively to the column 35 by means of the key 212 which slides in a keyway in the column 35. This ring mold cam and the whole of the ring mold structure and blow elements which will later be described is adapted to be raised and lowered in order to accommodate the machine to the manufacture of ware of different heights. This raising and lowering is accomplished by means of a large geared nut 214 which engages the threads 215 on the column 35. The gear member of the nut 214 engages a pinion 216 which is mounted to rotate in a sleeve carried by the ring mold cam 211, and this pinion is provided with an opening to receive the end of a squared shaft so that when the shaft is inserted and turned by a crank or hand wheel the large nut 214 will be turned on the threads 215 and since the upper end of this nut comprises the supporting member for the large ring mold cam and associated parts all of these parts will be raised and lowered as desired.

From the foregoing description and an inspection of Figures 2, 29 and 34 it will be clear that the split ring mold is positively actuated by the links 206 and 207 to open the mold and is spring actuated to close the same and that this mold is closed at all of the stations with the exception of station 5, where the ware is removed from the press.

Figure 1:
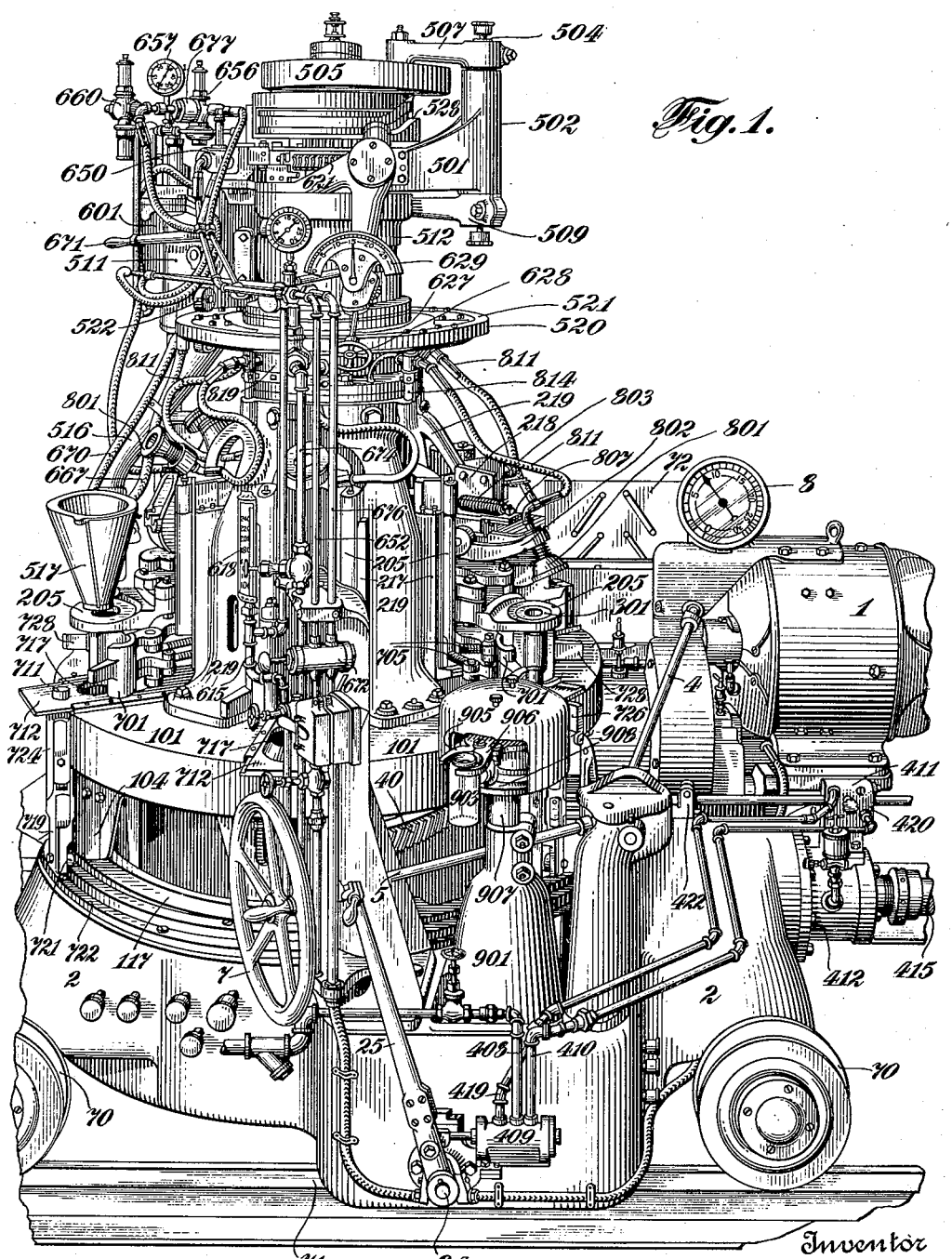
Figure 1 is a perspective view of the machine.

The ring mold frames 205 are mounted on slides 217, (Figs. 1, 2 and 26) which cooperate with guide plates 218 that are secured upon the legs of the spider 219 which legs are bolted to the mold table 101. These slides 217 facilitate the raising and lowering of the parts, as has previously been set forth.

Solid ring mold.

The solid ring mold (Figs. 1, 2, 26, 30 and 58) comprises a solid piece of metal 301 set in the outer end of the ring mold frame 205 in such manner that the axis of the opening in the ring 301 is coincident with the axis of the press mold. As the press mold is raised against the split ring mold the solid ring mold 301 is lowered into the recess 203 provided in the upper portion of the split ring mold so that the parts are tightly interfitted. This lowering of the solid ring mold is accomplished by a slight vertical movement of the ring mold frame 205 by means of the roller 302 which travels in the annular cam groove 304 (Figs. 2 and 58) so that as the mold table continuously rotates the solid ring mold 301 remains in a position over the split ring until after the blowing operation is completed and the cooling operation is begun, and until the ware is ready to be removed from the blow mold. By inspection of Figure 58 it will be noted that the ring mold is in depressed position for the first four stations and is in a raised position for stations E and F.

Feeder and draw-back mechanism.

In order that the description of the machine may follow its cycle of operations, it should be stated that the feeding of the glass occurs at station B after the press mold has been raised in position against the split ring and solid ring molds. It therefore is necessary to refer now to the feeding mechanism and more specially to Figures 1, 3, 6 and 7. When the machine is moved forward for operation the machine is in position to receive glass from a suitable feeder mechanism which may comprise a spout 401 having a bushing 402 through which glass periodically issues and is severed by shears 404 to drop as a lump charge into the mold. During the mold charge the bushing is covered by a flaming cup 405. The feeder mechanism is controlled by a control box 406 that is driven by the silent chain 68 referred to in connection with the feeder drive and shown in Figure 3.

When it is necessary to start the machine the main control hand lever 25 is operated to move the clutch lever 20 (Figs. 1, 3 and 6) to throw in the disk clutch for driving the machine and to throw out the positive clutch to drive the feeder. This control lever 25 operates an air control valve 407. Air is admitted to this valve 407 by the air line 408 and enters the middle portion of a balanced piston valve 409. When the control lever 25 is in the position shown in Figure 6 air from the air line 408 passes through the balanced valve into the pipe line 410 through the valve 411 and into the left end of the air cylinder 412 which is carried by the main base frame 2. The air fills the cylinder and drives the piston 414 outwardly since the piston is secured to the pushing rod 415 which is adjustably connected to the anchor 416 by means of hand wheels 417 and 418. During this operation the press will be moved forwardly under the glass feeder. When the main control lever 25 is swung to the left to operate the disk clutch to stop the press, then air from the air line 408 enters the pipe line 419 drives the cut-off valve 420 open and admits air to the right end of the cylinder 412. This causes the cylinder to telescope relatively to the piston 414 and withdraws the machine from beneath the feeder. Obviously during these movements of the machine the truck wheels 70 roll on the tracks 71. As the piston 414 approaches the left end of the cylinder the spring stop 421 engages the cut-off valve 411, which traps air between the left end of the cylinder and the piston 414 so that the machine comes to rest against an air cushion. The cut-off valve 420 is in a similar manner actuated by the spring stop 422 when the parts are moving into the position shown in Figure 6. Until the cut-off valves 411 and 420 operate, the air back of the piston escapes through the balance valve 409 and the passageway 424 to the exhaust pipe 425. When the press is withdrawn from beneath the feeder, the feeder will be driven through the positive clutch drive mechanism as has previously been explained and consequently will function as though it were feeding glass to the machine, but the charges of glass are permitted to fall through the opening 426 in the floor 427 and into suitable receptacles beneath the floor. The arrangement of the feeder over the opening in the floor and feeder mechanism per se do not form a part of the present invention and are only described in general terms as incidental to the present machine in order that the parts may be clearly understood in all of their associated and combined relations.

*Mold feed funnel.*

In view of the fact that the mold table and connected parts continuously rotate and the feeder for the glass is stationary it is desirable to provide devices to guide the glass into the press mold. This operation is accomplished by an oscillating funnel which moves for a time with the press mold, as the press mold passes beneath a feeder bushing, and after the mold has passed beyond the feed station the funnel quickly moves in the opposite direction to the movement of the table and assumes a position over the next succeeding mold. The mechanism for accomplishing this result is shown more specially in Figures 1, 2, 14, 15 and 19 to 22. A head frame 501 is solidly bolted on the upper end of the column 35 and carries a bearing 502 in which an arm shaft 504 is adapted to oscillate. The upper end of the vertical main shaft 34 carries an arm cam 505. A roller 506 on an upper arm 507 engages a cam groove 508 in the arm cam 505 and since the upper arm cam 507 is keyed to the shaft 504 this shaft will be oscillated when the cam 505 is rotated. This cam makes one complete rotation for each charge of glass fed so that the connected parts driven by this cam perform one cycle for each charge fed or six cycles for each rotation of the mold table. A lower arm 509 is keyed to the lower end of the shaft 504 and is connected by an adjustable link 510 with a swinging frame 511. This swinging frame comprises a sleeve 512 which is mounted upon bearings 514, and 515 and is adapted to oscillate about the column 35. This swinging frame 511 carries a downwardly projecting hollow curved arm 516 on the end of which is mounted a funnel 517. A portion of the wall of this funnel is double in order to provide a space 518 through which air may be exhausted to keep the funnel cool and a slot 519 enters the funnel tangentially in order to permit air or lubricant, if desired, to enter within the funnel to facilitate the passage of glass through the funnel as well as keep it cool. A lock ring 520 is carried by the upper portion of the spider 219 and therefore rotates with the mold table. The outer edge of this lock ring comprises a track 521 and forms the support for steadying rolls 522 which are carried by the swinging frame to assist in supporting the outer end of the frame. This lock ring is provided with lock bushings 524 which are located 60 degrees apart so that there is one bushing for each mold station upon the mold table. A lock pin 525 extends through the swinging frame 511 and is raised and lowered by a sliding head 526 which carries a roller 527 that travels in a lock pin groove 528 in the vertical wall of the arm cam 505. The arm groove 508 which operates the swinging arms is so timed with reference to the lock pin groove 528 that the lock pin 525 is forced into a lock bushing 524 each time the funnel 517 is directly over the solid ring mold and is traveling with the mold during the time when the funnel is adapted to guide a charge of glass into a press mold beneath the solid ring mold.

The diagrammatic view, Fig. 22, illustrates the movement of the funnel and the swinging arm and the pressing mechanism due to the rotation of the arm cam 505.

*Pressing mechanism.*

After the glass charge has dropped from the feeder through the funnel into the pressing mold the pressing operation is then performed on the glass. This mechanism is illustrated more specially in Figures 2, 8 to 11, 14 to 19, 23 to 25, 28 and 43. A pressing cylinder 601 is mounted on the outer end of the swinging frame 511 and is so positioned that when the lock pin 525 is in a lock bushing 524 and the funnel 517 is directly over a solid ring mold 301 to receive the glass, the axis of the pressing cylinder 601 is directly over the next preceding mold. This piston rod for pressing the glass extends through the cylinder 601 and is formed in two parts, the upper part 602 is screw threaded on a rod 604 that is connected with the lower part 605. The upper piston rod comprises a tubular sleeve which carries the upper piston 606. This tubular sleeve may be adjusted on the rod 604 and thereby adjust the distance between the upper piston 606 and the lower piston 607 which is locked on the lower part 605 of the piston rod. In this manner the length of stroke of the pressing plunger may be regulated and also the quantity of air used in the cylinder may be adjusted. The lower piston rod extends downwardly and carries a sleeve 608 on which is mounted sliding pins 609 that are connected with a pressure ring 610 which is adapted to apply spring pressure to the solid ring mold when the plunger descends, due to the fact that the pressure ring 610 contacts with the upper portion of the solid ring mold 301 and thereby securely clamps the parts during the pressing operation. The plunger (Fig. 9) comprises a head 611 which is hollow and which is adapted to be locked upon a boss 612 that is provided with water conduits 614 and 615, with a pipe 616 extending from the water conduit 614 so that cooling water may be circulated through the plunger to maintain the same at a proper temperature. A lock ring 617 locks the plunger head against the boss in such manner that the plunger head may be changed whenever it is desired.

The outgoing water conduit 615 carries a thermometer 618 (Figs. 1 and 8) and the incoming water conduit 614 is provided with a control valve 619. By increasing or diminishing the flow of water through the plunger head the temperature may be noted on the thermometer and may be regulated as desired so that the plunger may be at all times maintained under correct heat conditions.

Attention is now directed to Figures 2, 8 to 11, 14 to 20, 23, 24 and 25. An adjustable cam 620 is mounted on the head frame 501 and carries a worm wheel 621 which cooperates with the worm 622 (Figs. 23, 24 and 25) that is connected with the stub shaft 624 which carries bevel gear 625 that meshes with the bevel gear 626 on the pressing control shaft 627 and wihch is provided on the outer end with a hand wheel 628. An indicator 629 is provided with a needle 630 which is geared to the control shaft 627 and indicates the advancing or retarding of the adjustable cam when the hand wheel is turned to rotate the control shaft 627. This adjustable cam carries a cam member 631 which is held in position by screws 632. This cam member cooperates with the end of a trip mechanism which controls the air to the pressing plunger. The trip mechanism is carried on a frame 634 which is secured to the swinging frame 511 and comprises a rod 635 provided with roller 636 which engages the cam member. This rod carries a central collar 637 through which extends a sleeve 638 which is provided on each end with collars 639 and 640. Springs 641 and 642 extend between the central collar 637 and the end collars 639 and 640 respectively. Spring pressed latch members 644 are mounted on the frame 634 with the head 645 of these members adjacent the collars 639 and 640 respectively and with the inwardly extending arms 646 adjacent the central collar 637. The sleeve extends through the bearing 647 on the frame 634 and is connected with the valve actuating arm 648. An initiatory cam 649 is fastened to the under part of the arm cam 505 and as the arm cam rotates, making one rotation for each charge of glass, the initiatory cam 649 engages the roller on the end of the rod 635 and draws the rod inwardly. This causes the central sleeve 638 to strike the inner arm of the dog holding the collar 639. When this occurs the sleeve 638 is quickly pulled inwardly by the compressed spring 641 which is now released. This operation drives the balanced valve 650 inwardly to the position shown in Figure 17. Air is supplied to the middle conduit 651 from the air supply 652 and when the valve is in the position shown in Figure 17 the air flows into the pressing air pipe 654, which is provided with two branches. The branch 655 leads through the reducing valve 656 and directly in the upper end of the pressing cylinder 601. The reducing valve may be adjusted and set to deliver air at a predetermined pressure to the pressing cylinder. A pressure gage 657 is arranged on this pipe and shows the predetermined pressure of the air used during the pressing operation. When air enters through the reducing valve 656 into the cylinder 601 the piston is driven downwardly for pressing the glass charge in the press mold. The branch 658 is provided with a check valve 653 which prevents air pressure from going into the cylinder through this branch but which operates to permit air pressure to leave through the branch when the piston is raised by air pressure introduced underneath the piston as will now be described.

During the pressing operation the lock pin 525 is in the lock bushing 524 and the swinging frame 511 is traveling with the mold table 101. Since the frame 634 is mounted upon the swinging frame 511, the roller 636 is swept over the adjustable cam member 631 which moves the rod 635 outward and releases the outer catch so that the sleeve 638 moves the valve actuating arm 648 outwardly to draw the balanced valve 650 to the position shown in Figures 12 and 15. This admits air to the lift pipe line 659 through the adjustable reducing valve 660 and into the lower end of the cylinder 601, and thus quickly lifts the piston and the plunger upwardly. As the piston rises the air in the upper end of the cylinder is expelled through the branch pipe 658 to the balanced valve 650 and out through the exhaust port 661. This movement has carried the inner collar outwardly beyond the head of the inner latch so that as the frame 634 continues to move in a clockwise direction the head 662 passes over the beveled portion of the cam 663. This causes the valve actuating lever 648 to move the piston of the balanced valve 650 to neutral position where the pistons on the valve cover port 664 for the pressing air line 654 and also the port 665 for the plunger lift line 659, thereby trapping the air in the piston. As the air in the upper end of the cylinder has been partly exhausted and thus is of lower pressure than the air in the lower end of the cylinder, the air in the lower portion expands to further raise the piston, and the residual air in the upper end of the cylinder acts as a cushion. The parts are now ready for the next cycle of pressing operation. The lift pipe line 659 is also provided with a branch line 666 which is also provided with a check valve 673 that permits air to exhaust through the branch line without going back through the reducing valve in the main lift line 659 which would greatly impede the egress of the air.

The air from the exhaust port 661 from the upper part of the cylinder 601 exhausts into a line 667 which leads to the tangential slot 519 that opens into the funnel 517. This escaping air may be charged with an oil or fluid vapor by means of the sight lubricator 668 that leads oil to the cylinder 601 so that where it is desirable an oily vapor may be admitted to the interior of the funnel. The exhaust air from the lower part of the cylinder 601 is expelled through exhaust port 669 into a line 670 that leads to the space 518 between the walls of the funnel 517 so that the funnel is cooled during each pressing operation. A hand lever 671 is connected to the valve actuating arm 648 so that the valve may be hand operated whenever desired.

During the operation of the machine it might be desirable to quickly raise the plunger. To this end an operator's valve 672 is connected directly to the main air line 674, and air normally passes through this valve into the air supply pipe 652 to the balanced valve 650. However, if an emergency arises the operator pushes in the operating knob 675 on the operator's valve 672 and diverts the air into the emergency line 676 which opens the check valve 677 and permits air to quickly flow into the plunger lift line 659. This action of the operator's valve 672 also cuts off the supply of air through the line 652 so that the plunger will be quickly raised when this valve 672 is operated.

When the pressing operation is completed and the pressing mold 109 starts to descend, the lift pin 112 acts to sustain the pressed charge and also to admit air into the bottom of the mold to prevent formation of a vacuum therein as the charge is lifted. This pin 112 is sufficiently spaced from the mold walls to also permit the escape of air when the charge is dropped into the mold.

*Blow mold.*

After the glass charge has been pressed in the press mold to form the neck of the ware the press mold descends, as has been described, and the blow mold comes into operation. The mechanism for operating the blow mold is shown more especially in Figures 1, 2, 27, 35, 36 and 54. The blow mold illustrated is a split mold formed of members 701 that are pivotally mounted upon removable pins 702 that are held in place in sockets in the mold table 101 by lock pins 704. These blow mold members 701 are connected on the outside portions with the adjustable spring lines 705 which are slidable through posts 706 on the slide plate 707. This slide plate carries a roller 708 that travels in the groove 709 in the stationary cam 710 when the mold table 101 rotates around the column 35. The operation of this slide causes the links 705 to positively open the mold and permits the springs on the links to yieldingly close the mold. The bottom of the blow mold 701 comprises a base or button 711 carried upon a slide 712 that is mounted upon the mold table 101. The slide carries on its inner end an actuating roller 714 that travels in the groove 715 in the stationary cam 716 when the mold table revolves. This slide, (Fig. 36), is provided with an opening 717 through which the press mold 109 rises when the slide 712 is in outer position, which is the position of this member in all but two stations in the operation of the machine. This slide 712 is also provided with a slot 718 which provides clearance for the pin 702 that forms the pivot for the blow mold sections.

In order to hold the blow mold securely locked a cam operated lock is provided on the outer portion of the mold table. This lock is illustrated more specially in Figures 2, 54, 56 and 57. It comprises a base portion 719 which slides in guides 720 and carries a roller 721 that travels upon the circular cam 722 that is concentric with the block mold track 117. The base member 719 is telescopically connected with a carrier 724 that is maintained in extended position by a coiled spring 725. This carrier carries a locking head 726 that is mounted upon roller bearings 727 to provide lateral movement during the locking operation. Each mold member 701 is provided with an extension 728 that is provided with a downwardly inclined face so that when the locking head 726 is raised it wedges these members together and tightly locks the mold members in closed relation.

*Blowing mechanism.*

When the blow mold 701 is closed the blowing operation commences and the devices for this operation are illustrated more particularly in Figures 2, 26, 30, 31, 32, 47 and 48. The blow head 801 is adapted to fit tightly against the upper surface of the solid ring mold 301 and is carried upon a pair of swinging arms 802 which are pivoted to rotate on the ring mold frame 205. The blow head carries a spring 804 that is compressed when the arms 802 descend after the blow head contacts with the ring mold 301. The shaft 805 upon which the arms 802 are mounted carries a gear 806 which meshes with the slidable rack 807 that is also mounted upon the ring mold frame 205. This rack carries a roller 808 which the spring 803 holds against the stationary cam 809 that is mounted upon the column 35. The cam 809 is provided with an adjustable part 810 which permits the time of operation of this cam to be shortened or lengthened at will. As the mold table revolves the blow heads are raised and lowered by the operation of the sliding rack 807.

Each blow head 801 is connected by a flexible pipe with a control valve 811. This control valve 811 (Figs. 30 to 32 and 37 to 40) comprises a rotating body 812 in the casing 811 which body is provided with a single opening and is connected with an operating shaft 814 that is journaled in the spider 219 that is bolted to the mold table 101. Each shaft 814 is provided with a star wheel 815 that is actuated by the pins 816 and 817. The pin 816 is carried by the cam 80v and the pin 817 is adjustably mounted in the slot 813 in the cam 810. When the star wheel 815 contacts with the pin 816 the air valve is opened as shown in Figure 39 and as the star wheel passes the pin 817 the air is cut off from the blow head by closing of the valve as is shown in Figure 40, it being understood that the valve is moving in the direction of the arrows in Figures 38, 39 and 40.

A wind chest 818 is provided between the sleeve 819 of the lock ring 520 and the wall of the column 35. This wind chest is provided with wedge shaped packing rings 820 and 821 which are supported upon backing members 822 and 824 that are separated by springs 825. This wind chest is supplied with compressed air from the main supply line 674 which connects with the conduit 826 in the column 35. This connection is made through an opening 827 in the sleeve 512 of the swinging frame 511.

By referring to Figures 33 and 37 it will be noted that the cam 810 has a portion 828 that permits the blow head to slightly rise before the blowing air is cut off. This permits the air in the blown ware to escape under the blow head and also allows a blast of cold air to be blown into the ware in the mold to cool the ware.

A detailed description of the take off mechanism as set forth in the parent application Serial No. 553,900 is believed to be unnecessary in this divisional application as none of the claims herein are directed to this feature.

From the foregoing description and drawings it will appear that the present machine is relatively simple in construction and operation and is exceedingly flexible as to adjustments during operation and as to changes necessary to make different types of ware. The controls are all centered at one station where the operator may control the whole operation of the machine without moving from the station, and the continuity of operations renders the control adjustments easy to make.

Having thus described my invention, what I claim is:

1. In a machine of the class described; a rotating mold table; pivoted blow mold sections; means to open and close said sections; a press mold; devices to raise said press mold between the sections of the blow molds; a slide member, said slide member being provided with an opening through which the press mold is adapted to pass when moving to operative position to receive a glass charge; and a bottom for said blow mold sections carried by said slide member.

2. In a machine of the class described, a rotating mold table, pivoted blow mold sections, means to open and close said sections, a press mold, devices to raise said press mold between the sections of the blow mold, a slide member provided with an opening through which the press mold is adapted to pass in moving to operative position to receive a glass charge, a bottom for said blow mold sections carried by said slide, and means to move said slide to position said bottom between said blow mold sections before the sections are closed.

3. In a machine of the class described, a rotating mold table, a blow mold, a press mold, means to reciprocate said press mold vertically, a slide member provided with an opening through which said press mold is adapted to pass, and a bottom for said blow mold carried by said slide member.

4. In a machine of the class described; a vertical column; a mold table; mold members carried by said table; a screw threaded member carried by said column and adjustable vertical thereof; a stationary cam supported by said screw threaded member; and ring mold members supported by said stationary cam, said ring mold members cooperating with said mold members.

5. In a machine of the class described, a rotating mold table, a plurality of molds on said table, a ring mold frame, a split ring mold pivotally mounted upon said frame, a slide mounted upon said frame, spring links operatively connecting said slide with said split ring mold to open and close the same, and devices to automatically raise and lower said ring mold frame as the table rotates.

6. In a machine of the class described; a rotating mold table, a plurality of split blow molds carried by said table; a plurality of horizontal slides, each provided with an opening and a bottom for one of the blow molds; means to open and close the blow molds; means to move the bottoms from between the members of the blow molds when the blow molds are open and to align said openings with the blow molds; press molds normally positioned beneath the blow molds; and means to raise the press molds through the openings in the slides.

7. In a machine of the class described having a continuously rotating mold table carrying a mold divided into sections, a vertically movable carrier, a lock head mounted on said carrier and slidable horizontally with respect to the carrier, and a circular cam to move said carrier and lock head vertically to effect locking and unlocking of the mold sections.

8. In a machine of the class described having a continuously rotating mold table carrying a mold divided into sections, a vertical guideway, a lock head movable in said guideway, a base member spaced vertically from said lock head and also movable in said guideway, a spring to yieldingly transmit motion from said base member to said lock head, and a circular cam to move said base member vertically to effect locking and unlocking of the mold sections.

9. In a machine of the class described having a continuously rotating mold table carrying a series of molds divided into sections, projections extending horizontally from said mold sections and adapted to be engaged by locking means, vertical guideways beneath said extensions, lock heads movable vertically in said guideways, base members beneath said lock heads, springs to yieldingly transmit motion from said base member to said lock heads, and a single circular cam for moving all of said base members vertically to cause said lock heads to engage and disengage said horizontal extensions.

10. In a machine of the class described, a vertical column, a mold table rotatable about said column, radially movable slides having openings between their ends, mold bottoms projecting upwardly from said slides adjacent their outer ends, blow molds comprising sections pivoted to said table and adapted to embrace said mold bottoms, press molds mounted beneath said blow molds, a circular cam to open and close the blow molds, a second circular cam to move the slides outwardly when the blow molds are open and thereby remove the bottoms from the blow molds and align the slide openings with the axes of the blow molds, and means to raise the press molds through the openings in the slides to positions between the sections of the blow molds.

11. In a machine of the class described, a vertical column, a mold table rotatable about said column, radially movable slides having openings between their ends, mold bottoms projecting upwardly from said slides adjacent their outer ends, blow molds comprising sections pivoted to said table and adapted to embrace said mold bottoms, press molds mounted beneath said blow molds, a circular cam to open and close the blow molds, a second circular cam to move the slides outwardly when the blow molds are open and thereby remove the bottoms from the blow molds and align the slide openings with the axes of the blow molds, means to raise the press molds through the openings in the slides to positions between the sections of the blow molds, and a retracting cam to return said press molds to their original position.

12. In a machine of the class described, a vertical column, a mold table rotatable about said column, mold bottoms movable radially of said table, blow molds comprising sections pivoted to said table and adapted to embrace said mold bottoms, vertically movable press molds mounted beneath said blow molds and movable with the table, vertically movable locking means positioned adjacent said press molds, a cam to open and close said blow molds, a second cam to move the mold bottoms radially outward from between the blow mold sections when the blow molds are open, and cam means to automatically raise the press molds between the sections of the blow molds when the blow molds are open and to raise said locking means to lock the sections together when the blow molds are closed.

13. In a machine of the class described, a vertical column, a mold table rotatable about said column, mold bottoms movable radially of said table, blow molds comprising sections pivoted to said table and adapted to embrace said mold bottoms, a ring mold frame above said mold table, solid ring molds and split ring molds carried by said frame, vertically movable press molds mounted beneath said blow molds and movable with the table, cam means to automatically open said blow molds and close them in cooperative relationship with said ring molds, means to automatically move said mold bottoms radially outward from between the sections of the blow molds when the blow molds are open, and means to automatically raise said press molds between the sections of the blow molds and against the ring molds when the blow molds are open.

14. In a machine of the class described, a vertical column, a mold table rotatable about said column, mold bottoms movable radially of said table, blow molds comprising sections pivoted to said table and adapted to embrace said mold bottoms, a ring mold frame above said mold table, solid ring molds and split ring molds carried by said frame, vertically movable press molds mounted beneath said blow molds and movable with the table, cam means to automatically open said blow molds and close them in cooperative relationship with said ring molds, automatically operated locking means to lock the blow molds in their closed condition, means to automatically move said mold bottoms radially outward from between the sections of the blow molds when the blow molds are open, and means to automatically raise said press molds between the sections of the blow molds and against the ring molds when the blow molds are open.

15. In a machine of the class described, a vertical column, a mold table rotatable about said column, radially movable slides having openings between their ends, mold bottoms projecting upwardly from said slides adjacent their outer ends, blow molds comprising sections pivoted to said table, a ring mold frame above said table, solid ring molds and split ring molds carried by said frame, vertically movable press molds mounted beneath said blow molds, cam means to automatically open said blow molds and close them in cooperative relationship with said ring molds and in embrace of said mold bottoms, cam means to automatically move said slides outwardly when the blow molds are open and thereby remove the bottoms from the blow molds and align the slide openings with the axes of the blow molds, and means to automatically raise the press molds through the openings in the slides to positions between the sections of the blow molds and in cooperative relationship with the ring molds.

16. In a machine of the class described, a vertical column, a mold table rotatable about said column, radially movable slides having openings between their ends, mold bottoms projecting upwardly from said slides adjacent their outer ends, blow molds comprising sections pivoted to said table, a ring mold frame above said table, solid ring molds and split ring molds carried by said frame, a circular cam to automatically open and close the split ring molds, vertically movable press molds mounted beneath said blow molds, cam means to automatically open said blow molds and close them in cooperative relationship with said ring molds and in embrace of said mold bottoms, cam means to automatically move said slides outwardly when the blow molds are open and thereby remove the bottoms from the blow molds and align the slide openings with the axes of the blow molds, and means to automatically raise the press molds through the openings in the slides to positions between the sections of the blow molds and in cooperative relationship with the ring molds.

17. In a machine of the class described, a rotatable mold table, mold bottoms movable radially of said table, blow molds comprising sections pivoted to said table and adapted to embrace said mold bottoms, vertically movable press molds mounted beneath said blow molds and movable with the table, means to automatically open and close said blow molds, means to automatically move said mold bottoms from between the sections of the blow molds when the blow molds are open, means automatically operative when the blow molds are open to raise the press molds between the sections of the blow molds and later return the press molds to their initial positions, lift pins adapted to rise upwardly through the bottoms of the press molds, and means to automatically raise said lift pins relative to the press molds as the press molds start to descend.

18. In a machine of the class described, a vertical column, a mold table rotatable about said column, mold bottoms movable radially of said table, blow molds comprising sections pivoted to said table and adapted to embrace said mold bottoms, a ring mold frame above said mold table, solid ring molds and split ring molds carried by said frame, vertically movable press molds mounted beneath said blow molds and movable with the table, cam means to automatically open said blow molds and close them in cooperative relationship with said ring molds, automatically operated locking means to lock the blow molds in their closed condition, means to automatically move said mold bottoms radially outward from between the sections of the blow molds when the blow molds are open, means automatically operative when the blow molds are open to raise the press molds between the sections of the blow molds and later return the press molds to their initial positions, lift pins adapted to rise upwardly through the bottoms of the press molds, and means to automatically raise said lift pins relative to the press molds as the press molds start to descend.

19. In a machine of the class described, a vertical column, a mold table rotatable about said column, mold bottoms movable radially of said table, blow molds comprising sections pivoted to said table and adapted to embrace said molds bottoms, a ring mold frame above said mold table, solid ring molds and split ring molds carried by said frame, vertically movable press molds mounted beneath said blow molds and movable with the table, cam means to automatically open said blow molds and close them in cooperative relationship with said ring molds, means to automatically move said mold bottoms radially outward from between the sections of the blow molds when the blow molds are open, means automatically operative when the blow molds are open to raise the press molds between the sections of the blow molds and later return the press molds to their initial positions, lift pins adapted to rise upwardly through the bottoms of the press molds, and means to automatically raise said lift pins relative to the press molds as the press molds start to descend.

20. In a machine of the class described, a vertical column, a mold table rotatable about said column, mold bottoms movable radially of said table, blow molds comprising sections pivoted to said table and adapted to embrace said mold bottoms, a ring mold frame above said mold table, solid ring molds and split ring molds carried by said frame, a circular cam to automatically open and close the split ring molds, vertically movable press molds mounted beneath said blow molds and movable with the table, cam means to automatically open said blow molds and close them in cooperative relationship with said ring molds, automatically operated locking means to lock the blow molds in their closed condition, means to automatically move said mold bottoms radially outward from between the sections of the blow molds when the blow molds are open, means automatically operative when the blow molds are open to raise the press molds between the sections of the blow molds and later return the press molds to their initial positions, lift pins adapted to rise upwardly through the bottoms of the press molds, and means to automatically raise said lift pins relative to the press molds as the press molds start to descend.

21. In a machine of the class described, the combination of a rotatable mold table, a split blow mold on said table, a horizontal member having an opening and a bottom for said blow mold, means to move said member to remove the bottom from said blow mold and to align the said opening with the blow mold, a press mold positioned beneath the blow mold, and means to raise the press mold through the opening in said member.

MAX JAEGER.